United States Patent
Mitsuno et al.

(10) Patent No.: US 10,089,125 B2
(45) Date of Patent: Oct. 2, 2018

(54) VIRTUAL MACHINES ACCESSING FILE DATA, OBJECT DATA, AND BLOCK DATA

(71) Applicant: Hitachi, Ltd., Tokyo (JP)

(72) Inventors: Takanori Mitsuno, Tokyo (JP); Hiroshi Arakawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/114,096

(22) PCT Filed: Jul. 23, 2014

(86) PCT No.: PCT/JP2014/069468
§ 371 (c)(1),
(2) Date: Jul. 26, 2016

(87) PCT Pub. No.: WO2016/013075
PCT Pub. Date: Jan. 28, 2016

(65) Prior Publication Data
US 2017/0017507 A1    Jan. 19, 2017

(51) Int. Cl.
| | |
|---|---|
| G06F 9/455 | (2018.01) |
| G06F 9/46 | (2006.01) |
| G06F 13/00 | (2006.01) |
| G06F 12/00 | (2006.01) |
| G06F 3/06 | (2006.01) |

(52) U.S. Cl.
CPC ......... *G06F 9/45504* (2013.01); *G06F 3/061* (2013.01); *G06F 3/0604* (2013.01); *G06F 3/0659* (2013.01); *G06F 3/0664* (2013.01); *G06F 3/0683* (2013.01); *G06F 9/45558* (2013.01); *G06F 12/00* (2013.01); *G06F 2009/45562* (2013.01)

(58) Field of Classification Search
None
See application file for complete search history.

(56) References Cited

U.S. PATENT DOCUMENTS 8,966,476 B2 *  2/2015  Doan ............... G06F 9/45537
                                              711/114
9,613,053 B1 *  4/2017  Shusharin ........ G06F 17/30233
(Continued)

FOREIGN PATENT DOCUMENTS

| JP | 2006-268534 A | 10/2006 |
| JP | 2008-257682 A | 10/2008 |
| JP | 2009-289252 A | 12/2009 |

OTHER PUBLICATIONS

International Search Report of PCT/JP2014/069468 dated Nov. 11, 2014.
(Continued)

*Primary Examiner* — Bing Zhao
(74) *Attorney, Agent, or Firm* — Mattingly & Malur, PC

(57) ABSTRACT

A computer which is connected to a network and has a CPU and a plurality of storages, and which is capable of executing a plurality of virtual machines, wherein: the CPU acts as a first virtual machine so as to process a block access request received via the network; the CPU also acts as a second virtual machine so as to process a file access request received via the network; and the CPU also acts as a third virtual machine so as to process an object access request received via the network, and accesses a third storage.

8 Claims, 22 Drawing Sheets

(56) References Cited

U.S. PATENT DOCUMENTS

| | | |
|---|---|---|
| 2006/0218207 A1 | 9/2006 | Nonaka |
| 2008/0244196 A1 | 10/2008 | Shitomi et al. |
| 2009/0300079 A1 | 12/2009 | Shitomi |
| 2011/0246739 A1* | 10/2011 | Matsuda ............... G06F 3/0605 711/165 |

OTHER PUBLICATIONS

Toru Moriyama, "Byokan 100 Man I/O no Cho Kosoku ni Idomu Shin Flash Storage", Nikkei Computer, Jun. 13, 2013, No. 836, p. 58-65.

Chumoku o Atsumeru Server Kasoka Gijutsu/Solution, Business Communication, Nov. 1, 2007, vol. 44, No. 11, pp. 3-39.

International Preliminary Report on Patentability of PCT/JP2014/069468 dated Aug. 4, 2016.

* cited by examiner

F I G. 5

| VIRTUAL DEVICE ID | # | VOL ID | LBA | BLOCK LENGTH | POOL ID | ENTRY NO. | PAGE NO. | NEW ASSIGNMENT TIME | OBJECT FORMATION FINISH FLAG | OBJECT ID |
|---|---|---|---|---|---|---|---|---|---|---|
| VST01 | 1 | VOL1 | 00000000h | 100000h | Pool-1 | P0001 | 1000h | 2013/03/12 10:20:30 | 0 | — |
| | | VOL1 | 00100000h | 50000h | Pool-1 | P0001 | 500h | 2013/03/12 10:20:30 | 0 | — |
| | | VOL1 | 00150000h | 50000h | Pool-1 | P0001 | 500h | 2013/03/12 10:20:30 | 0 | — |
| VST01 | 2 | VOL1 | 00200000h | 100h | Pool-1 | P0002 | 1h | 2013/03/12 10:21:31 | 0 | — |
| VST01 | 3 | VOL1 | 00200100h | 500h | — | — | — | 2013/03/12 10:21:32 | 1 | ID001 |
| ... | ... | ... | ... | ... | ... | ... | ... | ... | ... | ... |

500

F I G. 6

| ENTRY NO. | PAGE NO. | RAID GROUP NO. | START LBA | BLOCK LENGTH | EFFECTIVE FLAG | ACCESS NUMBER OF TIME | HIERARCHICAL FLAG | ... | FINAL ACCESS TIME |
|---|---|---|---|---|---|---|---|---|---|
| P0001 | 00000000h | 0101h | 00000000h | 100h | Y | 165 | Tier-1 | ... | 2014/01/12 10:20:30 |
| P0001 | 00000001h | 0101h | 00000100h | 100h | Y | 165 | Tier-1 | ... | 2013/03/12 10:20:30 |
| ... | ... | ... | ... | ... | ... | ... | ... | ... | ... |
| P0001 | 00001FFFh | 0102h | 00001F00h | 100h | Y | 1 | Tier-1 | ... | 2014/01/11 10:20:32 |
| P0002 | 00020000h | 0102h | 00000200h | 100h | N | — | — | ... | 2014/01/11 11:22:33 |
| P0003 | 00020001h | 0301h | 00000000h | 100h | Y | 0 | Tier-3 | ... | 2013/12/12 10:21:32 |
| P0003 | 00020002h | 0301h | 00000100h | 100h | Y | 0 | Tier-3 | ... | 2013/12/12 10:21:32 |
| ... | ... | ... | ... | ... | ... | ... | ... | ... | ... |
| P0003 | 00022000h | 0303h | 00000F00h | 100h | Y | 0 | Tier-3 | ... | 2013/12/12 10:21:33 |
| P0004 | 00022001h | 0201h | 00002000h | 100h | Y | 130 | Tier-2 | ... | 2014/01/10 10:21:32 |
| P0004 | 00022002h | 0202h | 00002000h | 100h | Y | 130 | Tier-2 | ... | 2014/01/10 10:21:32 |
| ... | ... | ... | ... | ... | ... | ... | ... | ... | ... |
| P0004 | 00023000h | 0201h | 00012000h | 100h | Y | 156 | Tier-2 | ... | 2014/01/10 10:21:32 |
| ... | ... | ... | ... | ... | ... | ... | ... | ... | ... |

600

F I G. 9

| VIRTUAL DEVICE ID | FILE SYSTEM ID | FILE PATH | POOL ID | ENTRY NO. | PAGE NO. | NEW ASSIGNMENT TIME | OBJECT FORMATION FINISH FLAG | OBJECT ID |
|---|---|---|---|---|---|---|---|---|
| VST01 | FS001 | /dira | Pool-1 | P0004 | 1000h | 2014/02/12 22:11:44 | 0 | — |
| VST01 | FS002 | /dir | Pool-2 | P000X | 300h | 2014/01/11 03:31:12 | 0 | — |
| VST01 | FS002 | /dirx | — | — | — | 2013/03/12 10:20:30 | 81h | ID002 |
| ... | ... | ... | ... | ... | ... | ... | ... | ... |

900

F I G. 1 3

1300

| VIRTUAL DEVICE ID | OBJECT ID | POOL ID | ENTRY NO. | PAGE NO. | NEW ASSIGNMENT TIME |
|---|---|---|---|---|---|
| VST01 | ID001 | Pool - 4 | P000A | 100h | 2013/03/12 10:21:32 |
| VST01 | ID002 | Pool - 4 | P000B | 3000h | 2014/01/11 03:31:12 |
| ⋮ | ⋮ | ⋮ | ⋮ | ⋮ | ⋮ |

F I G. 1 4

| OBJECT ID | OBJECT STATE (KIND) | ACCESS NUMBER OF TIME | MANAGEMENT ORIGIN OS ID | DATA CAPACITY | VIRTUAL DEVICE ID | VOL ID /FILE PATH | LBA/ FILE SYSTEM ID | COMPRESSION /DUPLICATION EXCLUSION /AP LINKAGE | PRESERVE PERIOD | FINAL ACCESS TIME |
|---|---|---|---|---|---|---|---|---|---|---|
| ID001 | EFFECTIVE (BLOCK) | 0 | Block_1 | 20MB | VST01 | VOL1 | 00200010h | Y/N/Y | 2024/12/31 23:59:59 | 2014/02/12 22:11:44 |
| ID002 | EFFECTIVE (FILE) | 2 | File_2 | 30MB | VST01 | /dir | FS002 | Y/Y/N | 2024/12/31 23:59:59 | 2014/01/11 03:31:12 |
| ... | ... | ... | ... | ... | ... | ... | ... | ... | ... | ... |

1400

F I G. 1 5
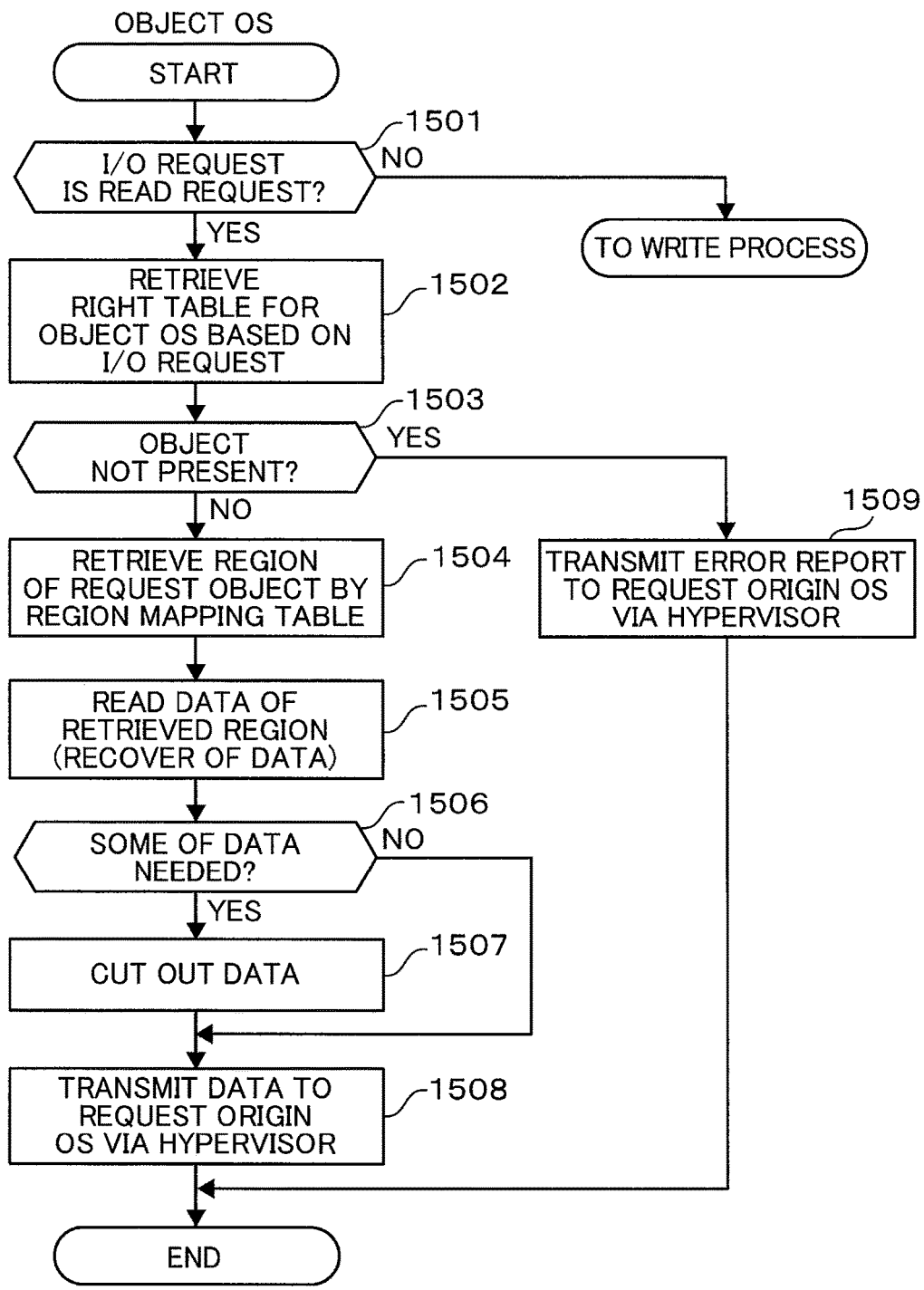

F I G. 2 1
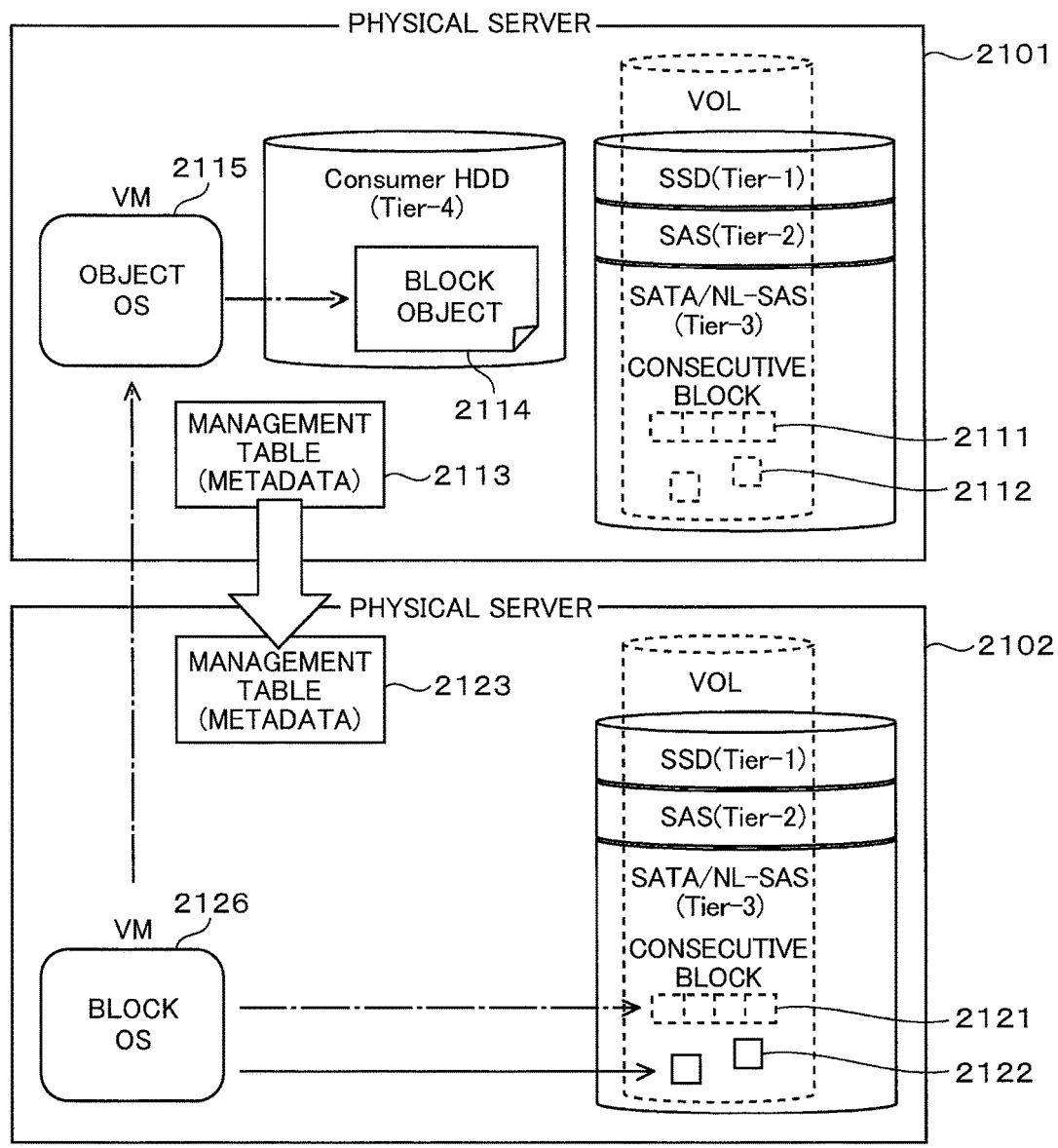

VIRTUAL MACHINES ACCESSING FILE DATA, OBJECT DATA, AND BLOCK DATA

TECHNICAL FIELD

The present invention relates to a storage, a computer, and a control method therefor.

BACKGROUND ART

In recent years, data utilized in an information system is diversified, and in accordance therewith, data of various access units, for example, block data, file data, object data and the like keep increasing. Further, by such an increase in various access units, devices exclusive for respective accesses are needed, which poses a problem. As a technology for resolving the problem, Software-defined Storage realizing a storage by software has been developed.

Further, for example, Patent Literature 1 discloses a technology of converting block data to file data and managing data by the file unit.

CITATION LIST

Patent Literature

Patent Literature 1: Japanese Patent Application Publication No. 2006-268534

SUMMARY OF INVENTION

Technical Problem

When the technology disclosed in Patent Literature 1 is used, file access can be carried out to block data. Block data and file data cannot be managed unifiedly by allowing block access to block data and allowing file access to the file data.

Hence, it is an object of the present invention to unifiedly manage block data and file data respectively made accessible transparently.

Solution to Problem

A representative computer according to the present invention is characterized in a computer which can execute plural virtual machines wherein the CPU processes block access received via the network as a first virtual machine, the CPU processes a file access received via the network as a second virtual machine, the CPU accesses a third storage by processing an object access received via the network as a third virtual machine.

Advantageous Effects of Invention

According to the present invention, the block data and the file data respectively made accessible transparently can unifiedly be managed.

BRIEF DESCRIPTION OF DRAWINGS

FIG. 5 A view showing an example of a management table for block OS.
FIG. 6 A view showing an example of a region mapping table.
FIG. 9 A view showing an example of a management table for file OS.
FIG. 13 A view showing an example of a table for an object OS management.
FIG. 14 A view showing an example of a metadata management table.
FIG. 15 A view showing an example of a read process flow of object OS.
FIG. 21 A view showing an example of migration between physical servers.

DESCRIPTION OF EMBODIMENTS

An explanation will be given preferable embodiments in reference to the drawings as follows. Further, although in the following explanation, various kinds of information may be explained by an expression of "xxx table", the various kinds of information may be expressed by a data structure other than table. In order to show that the data structure is not dependent, "xxx table" can be referred to as "xxx information".

Further, although in the following explanation, there is also a case of explaining a process with "CPU" as a subject, a CPU may be a processor or a controller including the CPU, the CPU executes a predetermined process by pertinently using memory resource (for example, memory) and/or communication interface device (for example, communication port) by executing a program. A process explained with a CPU as a subject may be made to be a process which is carried out by a system having the CPU (for example, computer or server). Further, the CPU may not only execute a program, but may include a hardware circuit executing a portion or a total of a process carried out by the CPU.

A program executed by a CPU may be installed to a computer by memory media which can be read by a program distribution source or a computer. In this case, the program distribution server includes a CPU and a memory resource, and the memory resource stores a distribution program and a program which is a distribution object. Further, a CPU of a program distribution server distributes a program of a distribution object to other computer by executing the distribution program.

Further, a computer includes an input/output device. Although there is a display and a keyboard and a pointer device as an example of the input/output device, the other device will do. Further, as a substitute for an input/output device, a serial interface or a network interface may be made to be an input/output device, a computer for display including a display or a keyboard or a pointer device may be connected to the interface, information for display may be transmitted to a computer for display, information for input is received from a computer for display, thereby, a display may be carried out by a computer for display, an input and a display by an input device may be substituted for by accepting an input.

First Embodiment

Figure 1:
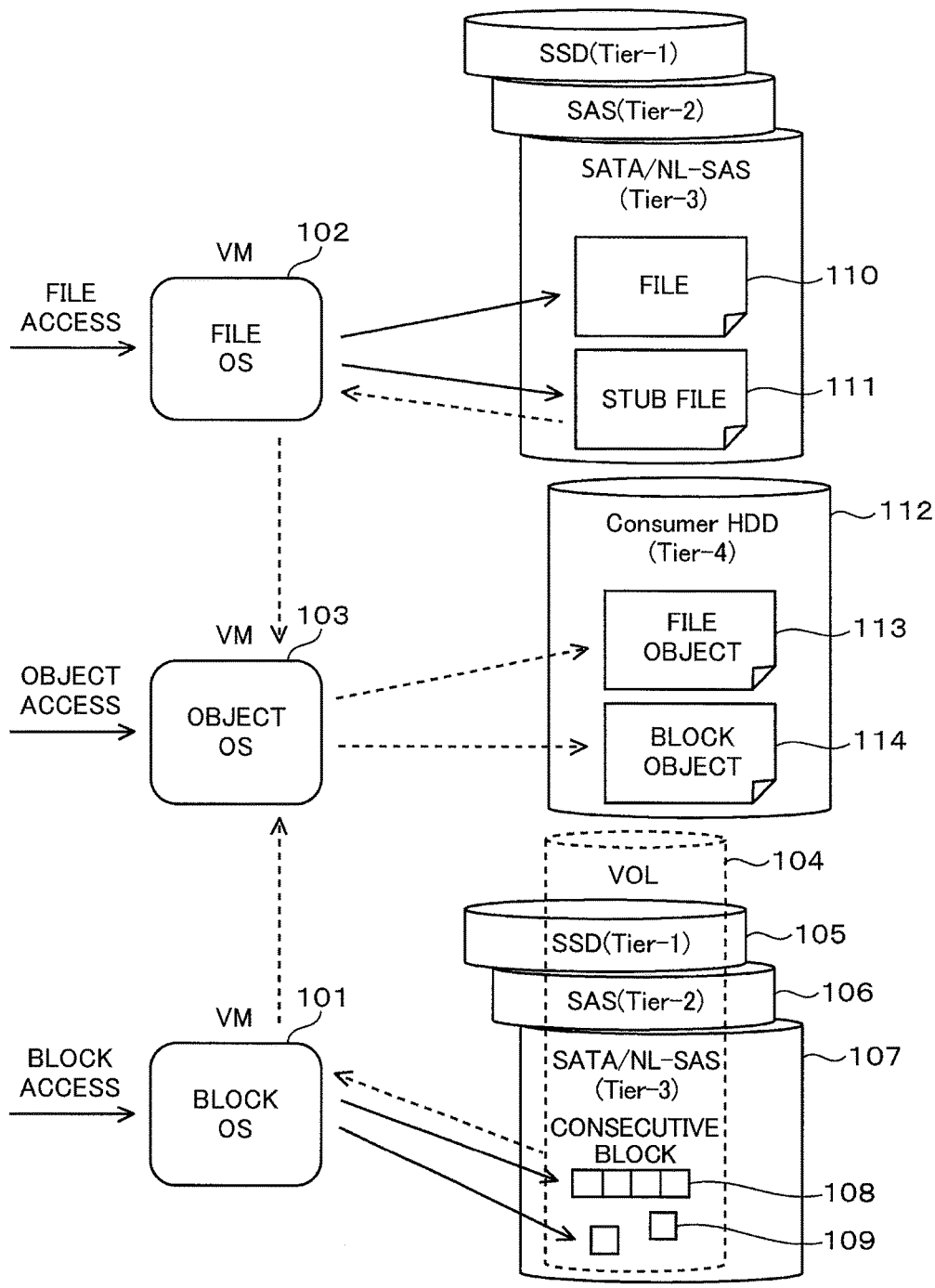
FIG. 1 A view for explaining an outline of access.

FIG. 1 is a view for explaining an outline of an access. For controlling block data and file data and object data by common hardware, plural VMs (Virtual Machines) are executed by a physical server, and a block OS (block storage OS) 101, a file OS (file storage OS) 102, and an object OS (object storage OS) 103 are executed by respective VMs. A constitution of a physical server will be explained later in reference to FIG. 2.

The block OS 101 is an OS (Operating System) for processing a block access, and controls reading and writing of data to and from a block 109 of VOL (Volume) 104 of a storage recognized by a client. The VOL 104 is configured by a storage device of, for example, three layers (three Tiers) physically, and is hierarchically controlled. SSD (Solid State Drive) 105 is a storage device of a high speed and a small capacity, HDD (Hard Disk Drive) of SAS (Serial Attached SCSI) is a storage device of a middle speed and a middle capacity, and the HDD of SATA (Serial ATA)/NL-SAS (Near Line-SAS) 107 is a storage device of a low speed and a large capacity.

The file OS 102 is an OS processing file access, configured by three layers of storage devices, for example, physically, and controls reading and writing of data to and from the file 110 which becomes an target of a hierarchic control. An object OS 103 is an OS processing an object access, and controls reading and writing of data to and from an object of Consumer HDD 112 which is SAS HDD or SATA HDD physically.

The object OS 103 not only receives an object access, but is linked with the block OS 101 and the file OS 102, and stores block data and file data as object data. In a case where consecutive blocks 108 equal to or larger than a predetermined length is not accessed for a constant period or more, the block OS 101 transmits the consecutive blocks 108 to the object OS 103, and stores to Consumer HDD 112 as a block object 114. The block OS 101 can utilize a freed region for storing other data by freeing the region of the consecutive blocks 108. In a case where reading data from the consecutive blocks 108 the region of which is freed, the block OS 101 reads out data from the block object 114 by requesting to the object OS 103.

Further, in a case where a file is not accessed for a constant period or longer, the file OS 102 transmits the file to the object OS 103, and stores the object file to Consumer HDD 112 as the file object 113. The file OS 102 can utilize a capacity of a reduced amount for storing other file by switching the file to a smaller stub file 111. In a case of reading out data from the switched file to the stub file 111, the file OS 102 reads out data from the file object 113 by requesting to the object OS 103.

The block data, the file data, and the object data are unifiedly stored, and can be controlled by the above process.

Further, although a condition for storing the file data or the block data as the object data is made to be a case where the consecutive blocks are not accessed for a constant period or longer, the condition is not limited thereto. Other conditions may be included.

Figure 2:
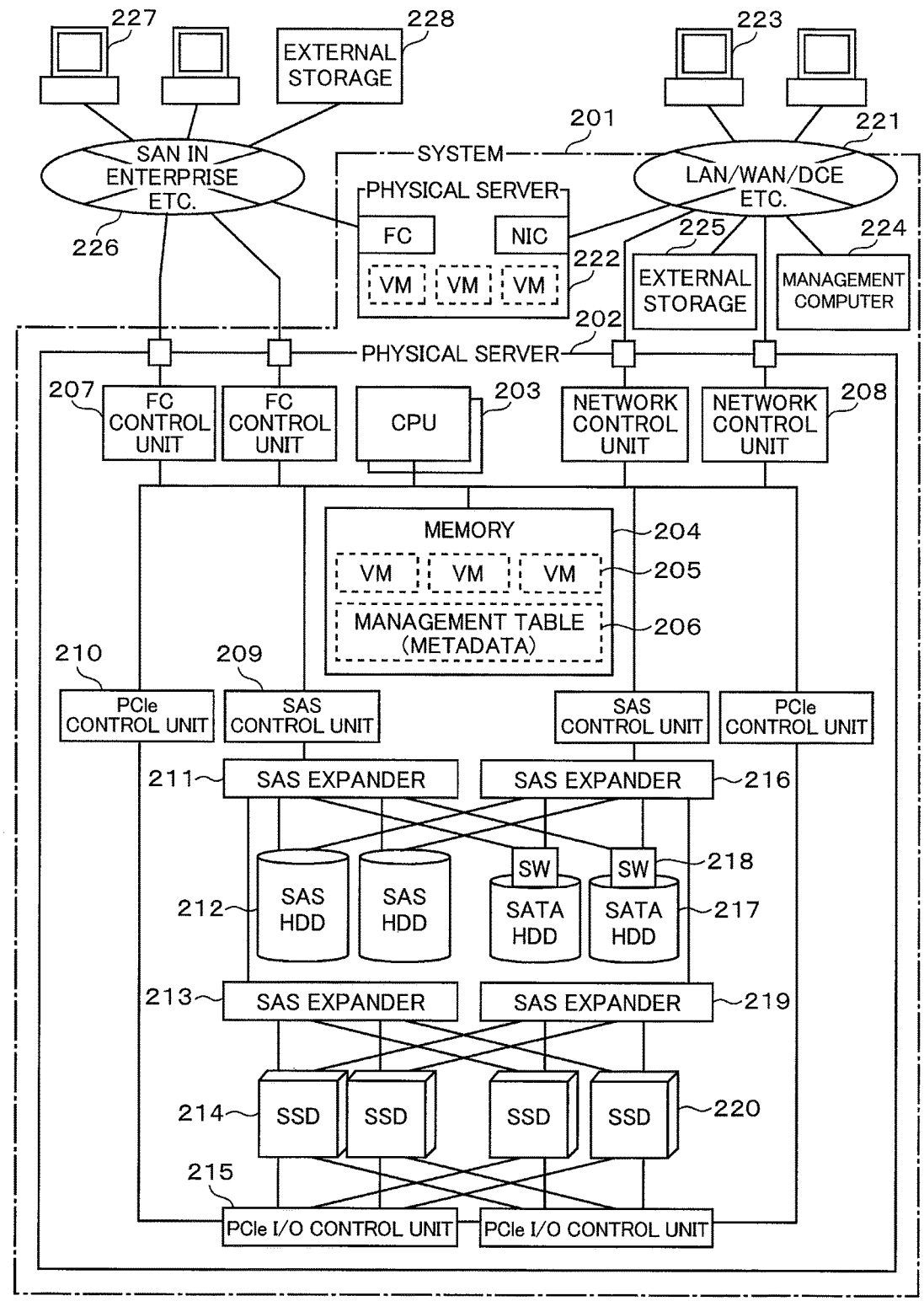
FIG. 2 A view showing an example of a system configuration.

FIG. 2 is a view showing an example of a system configuration. Plural physical servers 202 and 222 of the system 201 are servers for reading and writing data to and from a business client 223 via a network 221 including LAN (Local Area Network)/WAN (Wide Area Network)/DCE (Data Circuit terminating Equipment) or the like. The system 201 may include an external storage device 225 other than the physical servers 202 and 222 and the business client 223 may read and write data to and from an external storage device 225. Further, the system 201 may include a managing computer 224 manipulating a device in the system 201 of the physical server 202 or the like.

A CPU (Central Processing Unit) 203 of the physical server 202 controls a total of the physical server 202 by executing a program stored to the memory 204. The memory 204 stores a VM 205 and a management table (metadata) 206 to be explained later, and stores also a program or data that an illustrations and an explanation which are omitted since a program or data is the program or data for controlling the physical server 202 is not a characteristic of the first embodiment. Here, numbers of pieces of the CPU 203 and the memory 204 included by one physical server 202 are not limited to one piece.

An FC (Fibre Channel) control unit 207 is a control unit for connecting to a network 226 of SAN (Storage Area Network) in an enterprise or the like, and transmits data or receives data by receiving a request from the business client 227. A network control unit 208 is a control unit for connecting to the network 221. Further, the network control unit 208 may be an NIC (Network Interface Card). Also numbers of pieces of the FC control unit 207 and the network control unit 208 are not limited to two pieces but may be three pieces or more. The business clients 223 and 227 may be general computers having CPUs and memories.

An SAS control unit 209 controls a storage device via SAS expanders 211 and 213. The SAS expander 211 and the SAS expander 213 are connected by a daisy chain, and more SAS expanders may be connected to the daisy chain. The SAS specification also supports an SATA specification, and therefore, the SAS expander 211 is connected with an SAS HDD 212 and also connected with an SATA HDD 217. The SAS HDD 212 is a device with dual ports, and connected to also the SAS expander 216 such that when a failure occurs at a path of the SAS expander 211, the SAS HDD 212 is communicable. The SATA HDD 217 is device of a single port, and therefore, the SATA HDD 217 is communicable to the SAS expander 211 or the SAS expander 216 by switching two ports by a SW (Switch) 218.

The SSDs 214 and 220 are connected to the SAS expander 213 and the SAS expander 219 similar to SAS HDD 212. Further, a PCIe (PCI-Express) control unit controls a PCIe bus, and a PCIe I/O control unit 215 controls a device connected to a PCIe bus. The SSDs 214 and 220 may be connected to the PCIe bus other than the SAS. Relatively, the SSDs 214 and 220 have high prices, small capacities, and high speeds, the SAS HDD 212 has a medium price, a large capacity, and a medium speed, the SATA HDD 217 has a low price, a large capacity, and a low speed, and therefore, a hierarchic storage can be configured by combinations of these storage devices. Further, these are exemplifications, and more kinds of HDD or SSD may be included.

The business client 227 outside the system 201 reads and writes data to and from the physical servers 202 and 222 and the external storage device 228 via the network 226. Whereas the specification of FC is generally reading and writing of the block data, LAN or the like can also select a specification capable of reading and writing the block data, the file data, and the object data.

Figure 3:
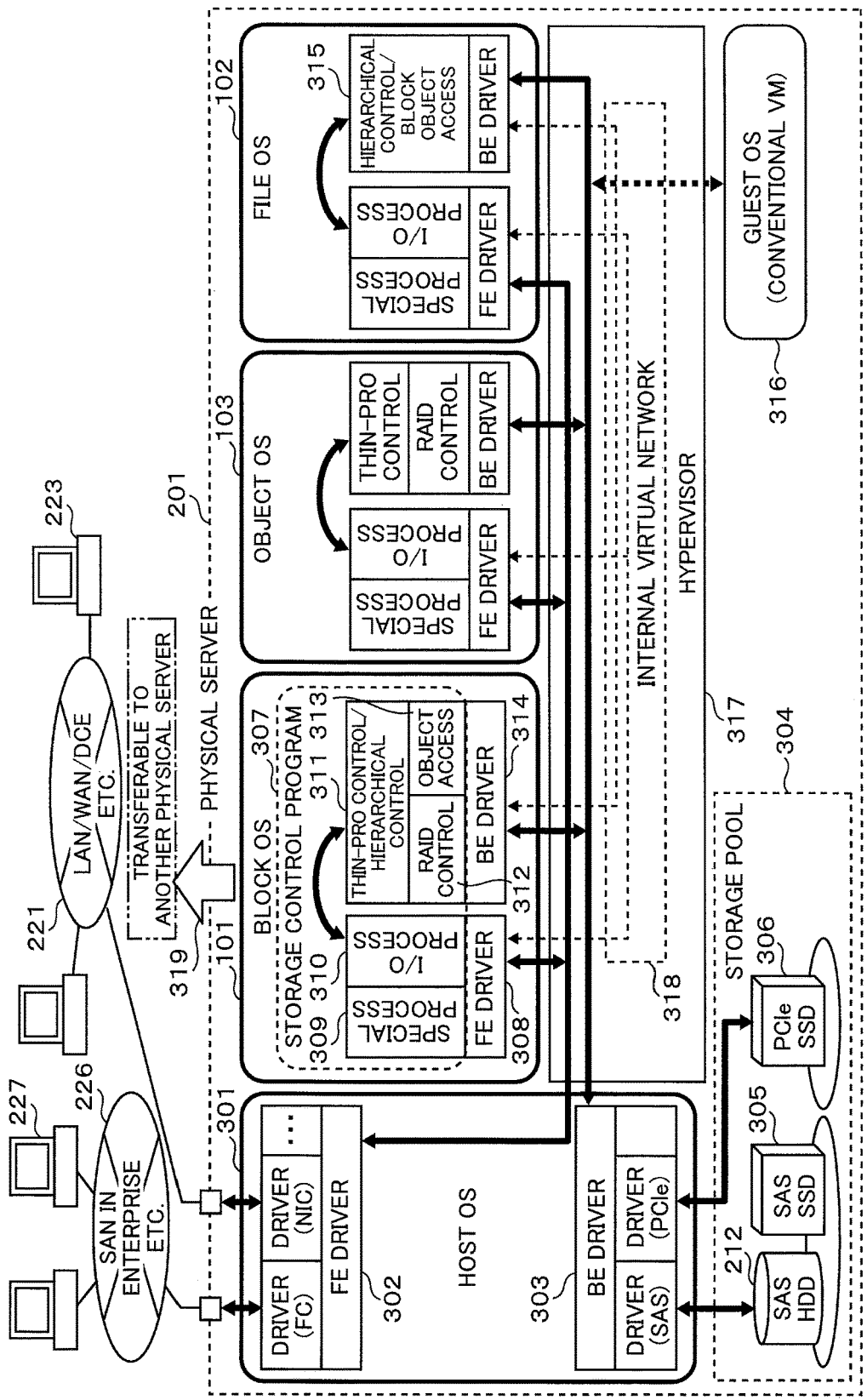
FIG. 3 A view showing an example of a software configuration.

FIG. 3 is a view showing an example of a software configuration. The physical server 201 stores software of plural VMs 205 to the memory 204, and the plural VMs 205 respectively include the block OS 101, the file OS 102, and the object OS 103. The plural VMs 205 are operated under management of the hypervisor 317 and use respective devices via the host OS 301. The host OS 301 is an OS executed by directly using hardware of the physical server 201. Respective OSs of the VM 205 are referred to also as guest OSs, and use a device which is hardware via an FE (Front End) driver 302 of the host OS 301 and a BE (Back End) driver 303. Further, although this is one configuration example of implementation of a general VM, a VM may be realized by another configuration.

The FE driver 302 includes a device driver of the FC control unit 207 or a device driver of the network control unit 208, and realizes communication with the business clients 223 and 227. The BE driver 303 includes a device driver of the SAS control unit 209 or a device driver of a PCIe control unit 210, and realizes communication with the storage device. Here, storage devices are the SAS SSD 305 and the PCIe SSD 306 are the SAS HDD 212 and the SSDs 214 and 220.

The FE driver 302 and the BE driver 303 may include respectively device drivers of plural hierarchies. For example, the BE driver 303 may include a driver of SATA at an upper layer of a device driver of SAS and communicate with the SATA HDD 217 by tunneling a logical protocol of SATA by a physical SAS linkage. The storage devices configure a hierarchic storage, and become a storage pool 304.

The FE driver 308 of the block OS 101 pretends as if the block OS 101 directly communicated with the business clients 223 and 227 by exchanging a request or data with the FE driver 302 via the hypervisor 317. Further, the BE driver of the block OS pretends as if the block OS 101 directly communicated with the storage pool 304 by exchanging a request or data with the BE driver 303 via the hypervisor 317.

The storage control program 307 of the block OS 101 executes reading and writing of block data by using the FE driver 308 and the BE driver 314. The I/O process 310 is a program for interpreting a request received from the business clients 223 and 227. The special process 309 is a program for replicating data, managing reading and writing of block data based on received various kinds of settings, and accepting a requesting a converting the block data to the object data. Further, the special process 309 of the block OS 101 may include a program of linking with an application program at an upper order.

The thin provisioning control/hierarchic control 311 is a program for controlling thin provisioning and controlling the hierarchic storage. A RAID control 312 is a program realizing RAID (Redundant Arrays of Inexpensive Disks) by using plural storage devices. An object access 313 is a program transferring the consecutive blocks 108 to the block object 144, and requesting to read out the reading request to the consecutive blocks 108 to the block object 144. The object access 313 uses the BE driver 314, communicating with the FE driver of the object OS 103 via a virtual network 318 enabling communication between VMs in the hypervisor 317 and processing the block object 144 by linking with the object OS 103.

Also the object OS 103 is basically configured to be the same as the block OS 101. Process flows of the special process and the I/O process differ from each other, and therefore, an explanation will be given later by using a flowchart. Further, the object OS 103 does not include a hierarchic control since the object OS 103 is a single layer of Tier-4. Also the file OS 102 is basically configured to be the same as the block OS 101. Process flows of the special process and the I/O process differ from each other, and therefore, an explanation will be given later with a flowchart. Further, although the file OS 102 includes a program for managing the file in accordance with a kind of a file system of a FAT (File Allocation Table) or a NTFS (NT File System) or the like, here, the file OS 102 does not depend on a kind of the file system, and therefore, an illustration and an explanation thereof are omitted.

The hierarchic control/block object access 315 includes a program for controlling the hierarchic storage, and a program for processing the file object 113 the same as the object access 313. The storage device of the SAS HDD 212 or the like per se is a device of reading and writing block data, and therefore, a program for which an illustration and an explanation are omitted converts file data to block data in accordance with a file system, and therefore, the hierarchic control/block object 315 access may further include a program for reading and writing block data.

In a case where the hierarchic control/block object access 315 does not include a program of reading and writing block data, the BE driver of the file OS 102 may communicate with the FE driver 308 of the block OS 101 via an internal virtual network 318, and use the block OS 101 as a program of reading and writing block data.

A program common to plural OSs may be put together in the host OS 301. For example, an RAID control common to the block OS 101 and the object OS 103 may be made to be a program of the host OS 301. Although the block OS 101, the file OS 102, and the object OS 103 are OSs respectively installed to the VM, the physical server 201 may include respectively plural OSs without being respectively limited to a single. OS.

Further, the physical server 201 may include only some kinds of OSs such that the physical server 201 only includes, for example, the block OS 101 and the object OS 102. In this case, the OS may be transferred to another physical server 222 of the system 201 as shown by an arrow mark 319. Further, a guest OS 316 which is not related to the block OS 101, the file OS 102, and the object OS 103 may be included.

Figure 4:
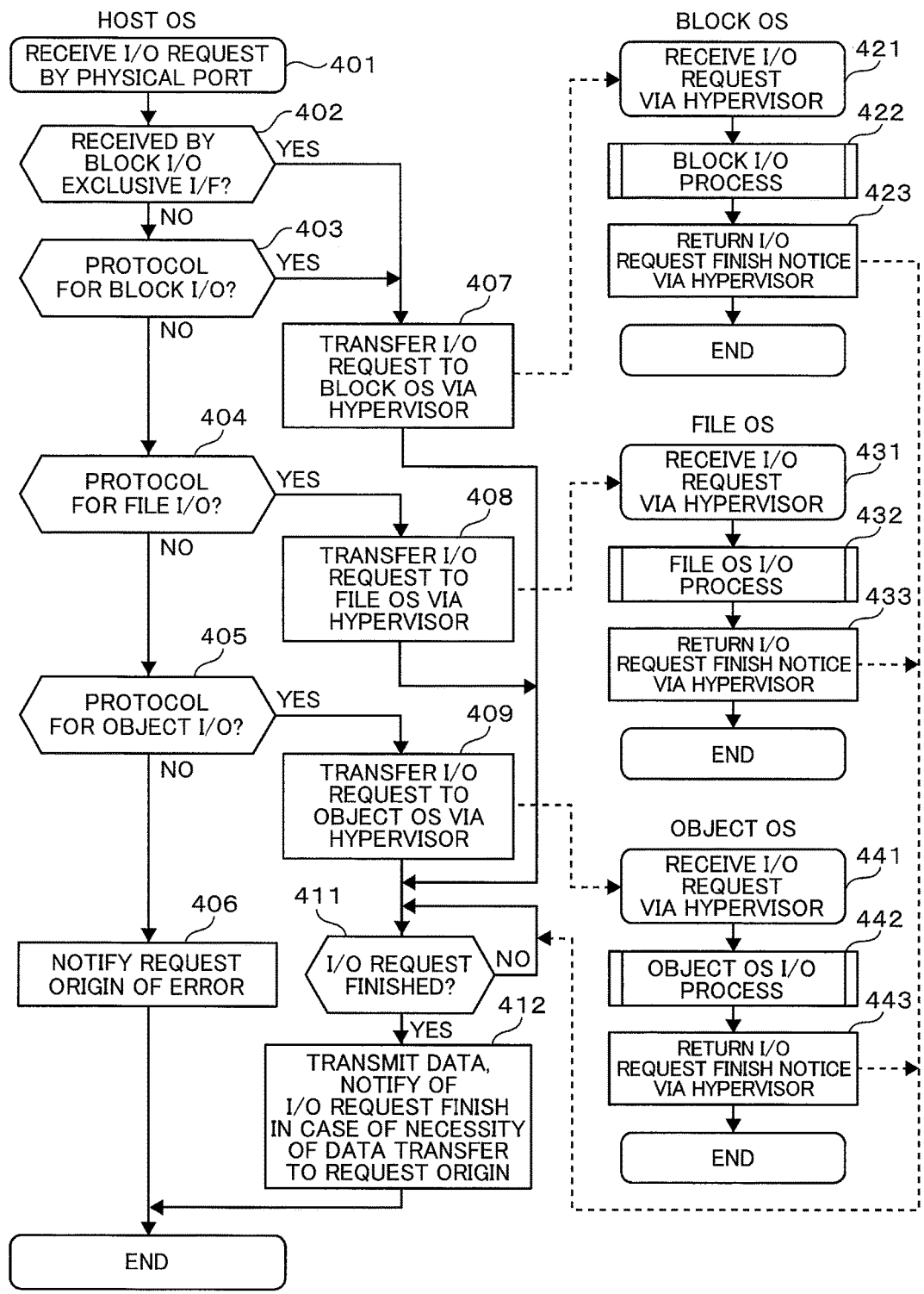
FIG. 4 A view showing an example of a process flow of I/O request.

FIG. 4 is a view showing an example of a process flow in a case where the physical server 202 receives I/O request from the business clients 223 and 227. The CPU 203 proceeds to step 402 when the CPU 203 executes, for example, the FE driver 302 of the host OS 301 and receives I/O request at step 401. The CPU 203 determines whether I/O request is received by an interface exclusive for I/O of the block data at step 402. Here, the interface exclusive for I/O of the block data is, for example, the FC control unit 207. The CPU 203 proceeds to step 407 in a case where it is determined that the I/O request is received at the FC control unit 207, and proceeds to step 403 otherwise.

The CPU 203 determines whether a protocol of the I/O request received at step 403 is a protocol for I/O of the block data. Further, the protocol for I/O of the block data is a protocol of, for example, FC or iSCSI (internet SCSI). The CPU proceeds to step 407 in a case of determining a protocol of FC or the like and proceeds to step 404 otherwise. The CPU 203 transfers an I/O request to the block OS at step 407. The I/O request is received by the FE driver 308 of the block OS 101 via the hypervisor 317. The CPU 203 proceeds to step 411 when I/O request is transferred at step 407, and awaits a notice of I/O request finish from the block OS 101.

In contrast thereto, the CPU 203 proceeds to step 422 when the I/O request from the hypervisor 317 is received at step 421, executes a block I/O process at step 422, and returns an I/O finish notice to the host OS 301 via the hypervisor 317 at step 423. A process at step 422 will further be explained later. Further, the CPU executing the host OS 301 and the CPU for executing the block OS 101 may be the same CPU in plural CPUs 203, or may be different CPUs.

At step 404, the CPU 203 determines whether a protocol of a received I/O request is a protocol for I/O file data. Here, the protocol for I/O of the file data is a protocol of, for example, an NFS (Network File System) or the like. The CPU 203 proceeds to step 408 in a case where the protocol of the NFS or the like is determined, and proceeds to step 405 otherwise. The CPU 203 transfers the I/O request to the file OS 102 at step 408. The I/O request is received by the FE driver of the file OS 102 via the hypervisor 317. The CPU 203 proceeds to step 411 when the I/O request is transferred at step 408, and awaits a notice of the I/O request finish from the block OS 101.

In contrast thereto, the CPU 203 executes the file OS 102, and proceeds to step 437 when the I/O request from the hypervisor 317 is received at step 431, executes the file I/O process at step 432, and returns the I/O finish notice to the host OS 301 via the hypervisor 317 at step 433. The process at step 432 will further be explained later.

The CPU 203 determines whether the protocol of I/O request received at step 405 is a protocol for I/O of the object data. The CPU 203 proceeds to step 409 in a case where it is determined that the protocol of the I/O request is a protocol for I/O of the object data, and proceeds to step 406 otherwise. The CPU 203 transfers the I/O request to the object OS 203 at step 409. The I/O request is received by the FE driver of the object OS 103 via the hypervisor 317. The CPU 203 proceeds to step 411 when the I/O request is transferred at step 409 awaits a notice of the I/O request finish from the block OS 101.

In contrast thereto, the CPU 203 executes the object OS 103, proceeds to step 442 when the I/O request from the hypervisor 317 is received at step 441, executes the file I/O process at step 442, and returns the I/O finish notice to the host OS 301 via the hypervisor 317 at step 443. An explanation will further be given later of the process at step 442.

At step 406, the CPU 203 finishes the process by informing an error to the I/O request origin since the I/O request cannot be processed. The CPU 203 executes a loop of awaiting the I/O request finish the notice at step 411. When the I/O request finish notice is received, the CPU 203 transmits data in a case where the I/O request needs to transfer data to the business clients 223 and 227 of the request origin as in a read request, notifies of the I/O request finish and finishes the process.

FIG. 5 is a view showing an example of a management table for block OS. The management table 500 for the block OS is a table for corresponding a region of I/O request of the block access from the business clients 223 and 227 and a region of a storage pool 304. Although designation of a region of the I/O request includes a virtual device ID, a VOL ID, an LBA (Logical Block Address), and a block length, the designation is not limited thereto but any information will do so far as the information is information specifying the region of the I/O request. Although the designation of the region of the storage pool 304 includes a pool ID, an entry number and a page number, the designation is not limited thereto but any information will do so far as the information is information which can manage a region as the storage pool 304.

Further, the management table 500 for block OS includes a flag indicating whether the object formation has been finished and an object ID in a case of finishing the object formation finish. In a case where the object formation finish flag is "0", the object formation has not been finished, data is stored as a block, and in a case where the object formation finish flag is "1", data is stored as an object. As has been explained in reference to FIG. 1, when the consecutive blocks 108 are formed into an object to be the block object 114, a region of the consecutive blocks 108 are freed, and therefore, the pool ID, the entry number, and the page number become ineffective values of "–" in which the object formation finish flag corresponds to "1".

In an example shown in FIG. 5, in a case where in the I/O request, the virtual device ID of the request region is "VST01", VOL ID is "VOL1", LBA is "00200000h" ("h" expresses a hexadecimal number), in a case of the block length is "500h", the pool ID, the entry number, and the page number are ineffective, and an access can be made to a request region by converting the request region in an I/O request to "ID001" of the object ID and I/O is requested to the object OS 103. Further, a portion of a region of "ID001" of the object ID may be subjected to I/O request to the object OS 103. Further, in order to show a region which is completely deleted or freed, in the management table 500 for block OS, the pool ID, the entry number, and the page number may be made ineffective and the object formation finish flag may be made to be "0", and the management table 500 of block OS may include a deletion finished flag.

FIG. 6 is a view showing an example of a region mapping table 600. The region mapping table 600 is a table corresponding a region of the storage pool 304 and a region of a physical storage device of the SAS HDD 212 or the like, and one region mapping table 600 is present for one pool ID. Therefore, a value of the pool ID is not included in the region mapping table 600, and designation of a region of the storage pool 304 includes an entry number and a page number. Further, although designation of a region of SAS HDD 212 or the like includes a RAID group number, a start LBA, and a block length, the designation is not limited thereto, and any information will do so far as the information is information specifying a region which can be received by the SAS HDD 212 or the like for specifying the region of the SAS HDD 212 or the like.

An effective flag is information expressing whether a corresponding page is an target of a hierarchic control, in a case where the effective flag is "Y", a hierarchic control is executed for a corresponding page, and in a case where the effective flag is "N", the hierarchic control is not executed for data of the corresponding page. An access number of times is information expressing a number of times of reading and writing the corresponding page. The hierarchic flag is, for example, information expressing three Tiers which have been explained in reference to FIG. 1, and in a case where the effective flag is "Y", the information of the hierarchic flag becomes effective. A final access time records time of final accessing the corresponding page.

In a case where data in a page has already been deleted, the effective flag is "N", and the access number of times and the hierarchic flag are ineffective. The access number of times and the final access time may be utilized for determining to which hierarchy the hierarchic flag belongs. For example, a page in which an access number of times is large, and a final access time is near to a current time may be controlled such that the hierarchic flag becomes from Tier-3 to Tier-2 or from Tier-2 to Tier-1. Further, in the example of the region mapping table 600, a storage region is managed with a page as a minimum unit, and one page is made to have a block length of "100h".

Figure 7:
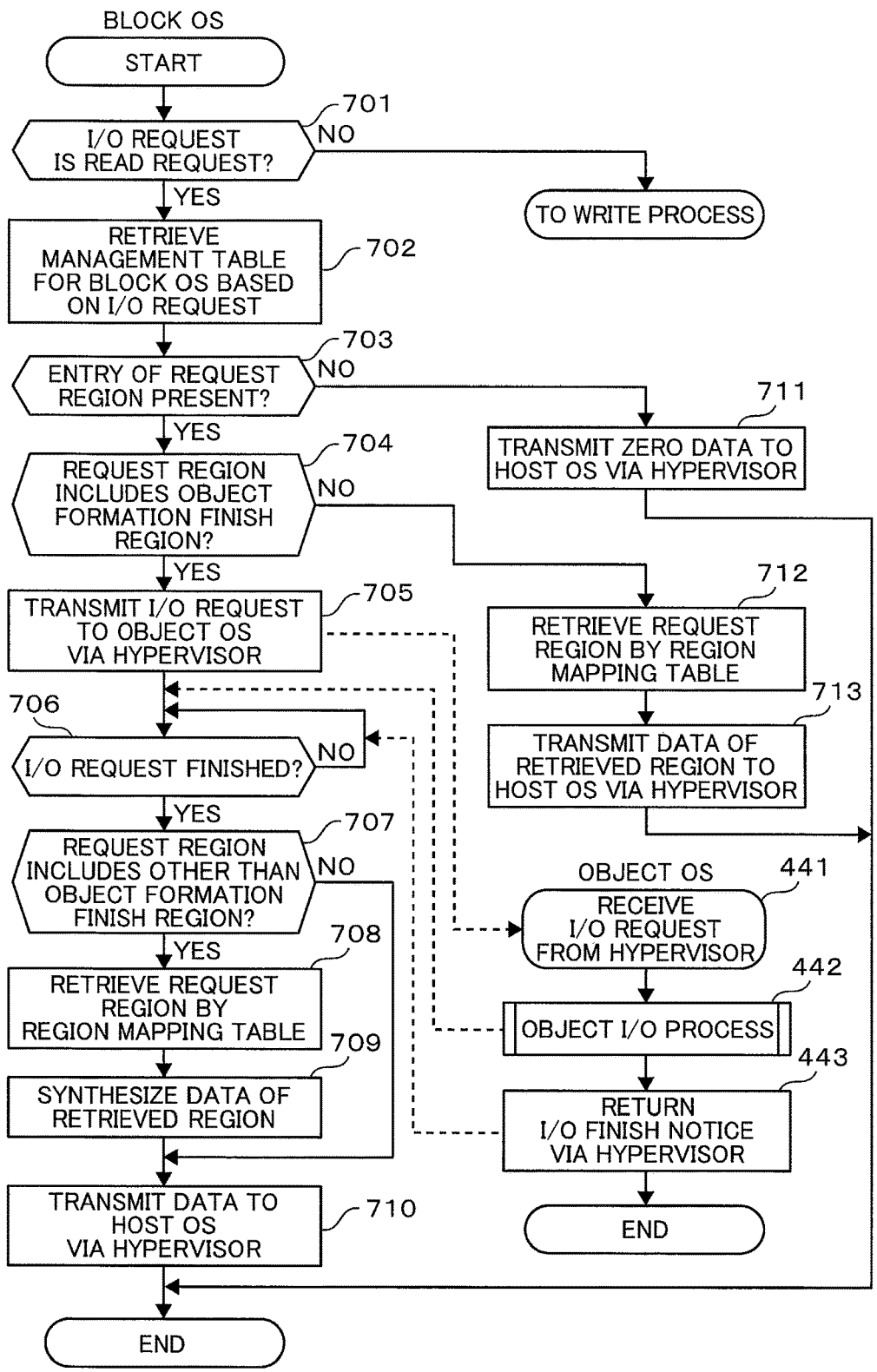
FIG. 7 A view showing an example of a read process flow of block OS.

FIG. 7 is a view showing an example of a process flow of the block OS 101. When the CPU 203 advances to step 422 of FIG. 4, a process flow shown in FIG. 7 is executed. The CPU 203 executes, for example, an I/O process 310 of the block OS 101, and determines whether the I/O request is a read request at step 701. In a case where the I/O request is determined not to be the read request, the CPU 203 advances to a write process shown in FIG. 8. In a case where the I/O request is determined to be the read request, the CPU 203 advances to step 702, and retrieves the management table 500 for block OS based on virtual device ID, VOL ID, LBA, and the block length included in the I/O request.

The CPU 203 determines whether an entry of a request region which becomes a read target of the I/O request is present at step 703, that is, whether an entry agreeing as a retrieval result of step 702 is found. In a case where the entry of the request region is determined not to be present, data to be read is not found, and therefore, the CPU 203 transmits zero data of the block length requested by the I/O request at step 711 to the host OS 301 via the hypervisor, and the process is finished.

In a case where the entry of the request region is determined to be present, the CPU 203 determines whether a region of object formation finish is included in a request region which becomes a read target at step 704. That is, determines whether the entry in which the object formation finish flag is "1" is included in what agrees as a retrieval result of step 702. In a case where it is determined that the request region does not include the object formation finish region, the CPU 203 retrieves a request region by the region mapping table 600 at step 712.

That is, the CPU 203 acquires a pool ID, an entry number, and a page number from the management table 500 for the block OS of what agrees as the retrieval result at step 702, and finds what agrees to these acquired pieces of information of in the region mapping table 600. Further, the CPU 203 acquires the RAID group number, the start LBA, and the block length from the region mapping table 600, reads data of the acquired region to transmit to the host OS 301 via the hypervisor 317, and finishes the process.

In a case where it is determined that the request region includes the region of object formation finish, the CPU 203 transmits the I/O request of the region of the object formation finish included in the request region to the object OS 103 via the hypervisor 317 at step 705. Although the CPU 203 executes step 441 through step 443 of the object OS 103, the process has already been explained. The CPU 203 awaits a notice of I/O request finish of the object OS 103 at step 706. When reading out to the region of the object formation finish is finished, CPU 203 determines whether the region in which object formation is not finished at the request region at step 707.

That is, CPU 203 determines whether what agrees whether an entry in which the object formation finish flag is "0" is included in what agrees as the retrieval result at step 702. In a case where it is determined that a region in which object formation is not finished is not included, the operation proceeds to step 710 since there is only the region in which the object formation is finished, and CPU 203 transmits data acquired at object OS 103 to the host OS 301 via the hypervisor 317, and finishes the process.

In a case where it is determined that the region in which the object formation is not finished is included, the operation advances to step 708 since both regions of the region in which the object formation is finished and the region in which the object formation is not finished, and the CPU 203 retrieves the request region by the region mapping table 600 similar to step 712. Further, data acquired similar to step 713 and the data acquired at the object OS 103 are synthesized at step 709 by the CPU 203. The CPU 203 transmits data synthesized at step 710 to the host OS 301 via the hypervisor 317, and finishes the process.

Figure 8:
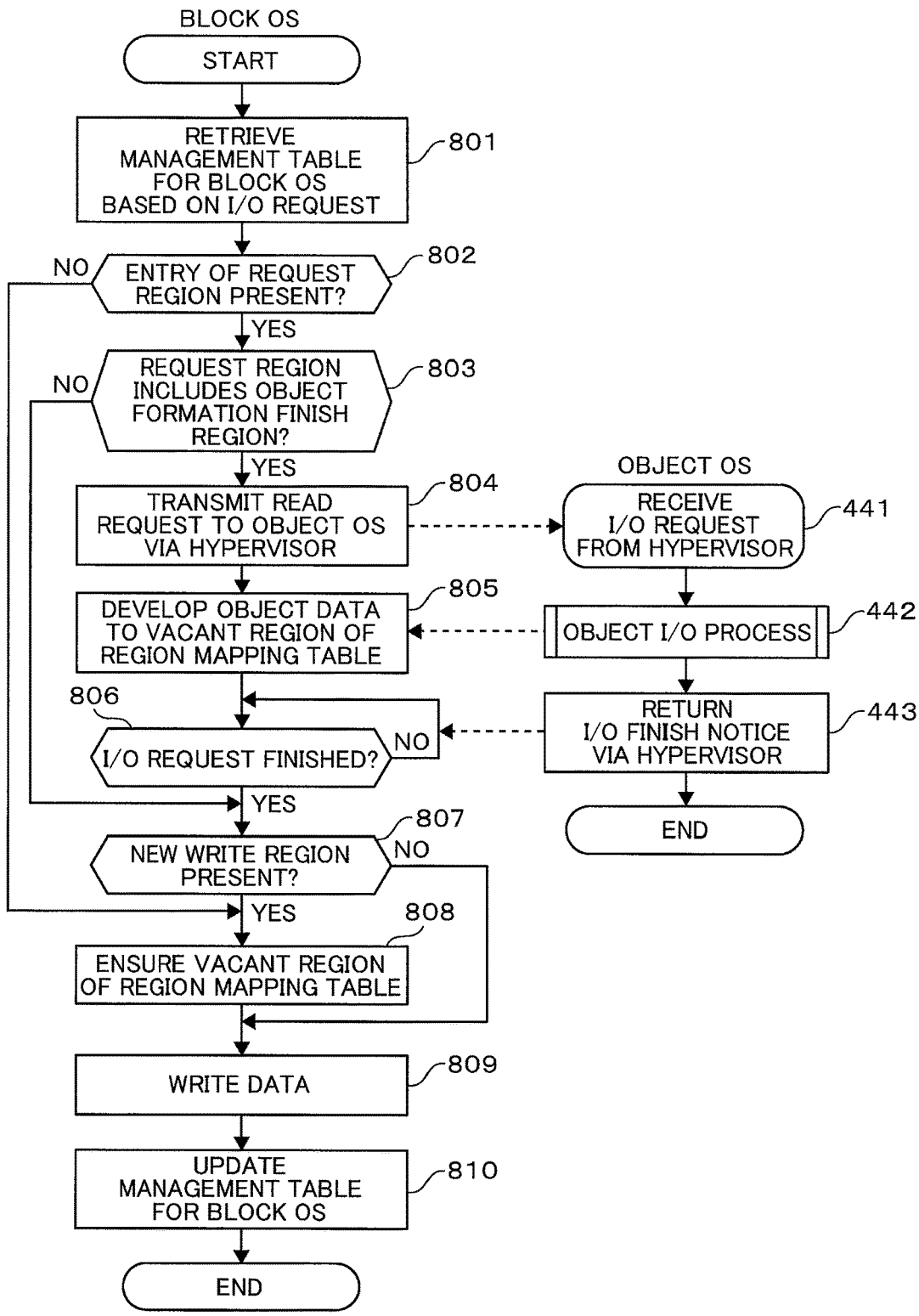
FIG. 8 A view showing an example of a write process flow of block OS.

FIG. 8 is a view showing an example of a write process flow of the block OS 101. When the CPU 203 determines as "NO" at step 701 shown in FIG. 7, the operation advances to step 801 shown in FIG. 8. Step 801 through step 803 are the same as step 702 through step 704 shown in FIG. 7. In a case where it is determined that an entry of a request region is not present at step 802, CPU 203 advances to step 808 since this is write to new region.

The CPU 203 ensures a vacant region of the region mapping table 600 for assigning a region used for writing from the storage pool 304. That is, the CPU 203 determines a combination in which the pool ID, the entry number, the page number, the RAID group number, and the start LBA are not used based on the block lengths of the I/O request. Further, the CPU 203 writes data from the start LBA of the RAID group number determined at step 809 to the block length of the I/O request. The CPU 203 registers the pool ID and the entry number and the page number, and a virtual device ID of the I/O request, VOL ID, LBA, and the block length to the management table 500 of the block OS at step 810 and finishes the process.

The CPU 203 advances to step 807 and determines whether write to a new region is included in a case where it is determined that the request region does not include the region of object formation finish at step 803. In a case where it is determined that write to the new region is included, the operation advances to step 808, and ensures the vacant region of the region mapping table 600 which has already been explained. Further, the CPU 203 writes data to both of the new region and the region which is not new at step 809. In a case where it is determined that write to the new region is not included at step 807, the CPU 203 advances to step 809 since the region has already been registered to the region mapping table 600, and the CPU 203 writes data at step 809.

In a case where it is determined that the request region includes the region in which the object formation is finished at step 803, the operation advances to step 804, and the CPU 203 transmits the read request of the region in which the object formation is finished to the object OS 103 via the hypervisor 317. Although the CPU 203 executes step 441 through step 443 of the object OS 103, the process has already been explained. In contrast thereto, the CPU 203 ensures a vacant region of the region mapping table 600 similar to step 808 for storing acquired data of the object OS 301 at step 805. Further, acquired data of the object OS 301 is developed to an ensured vacant region, and a notice of I/O request finish is awaited at step 806.

When the notice of the I/O request finish is received at step 806, that is, when reading to the region in which the object formation is finished is finished, the CPU 203 advances to step 807, and executes the process which has already been explained since this is the same as the state in which the region of object formation finish is not included.

In this way, reading and writing data including a block object can be executed by the block access even when the block is formed into the object without being conscious of the object formation.

FIG. 9 is a view showing an example of a management table 900 for file OS. The management table 900 for file OS is a table associating a region of the I/O request of the file access from the business clients 223 and 227 with the region of the storage pool 304. Although designation of the region of the I/O request includes a virtual device ID, a file system ID, and a file path, the designation is not limited thereto, but any information will do so far as the information is information specifying the region of the I/O request. The designation of the region of the storage pool 304 and information concerning object have already been explained in reference to FIG. 5. Here, although "1" of the object formation flag expresses that data is stored as an object, "81h" of the object formation flag is information expressing that object data is developed to the temporary storage region, and a further explanation thereof will be given later. Further, the management table 900 for file OS may be created based on I/O request of creating a file path or a directory, or may be created by an exclusive designation.

Figure 10:
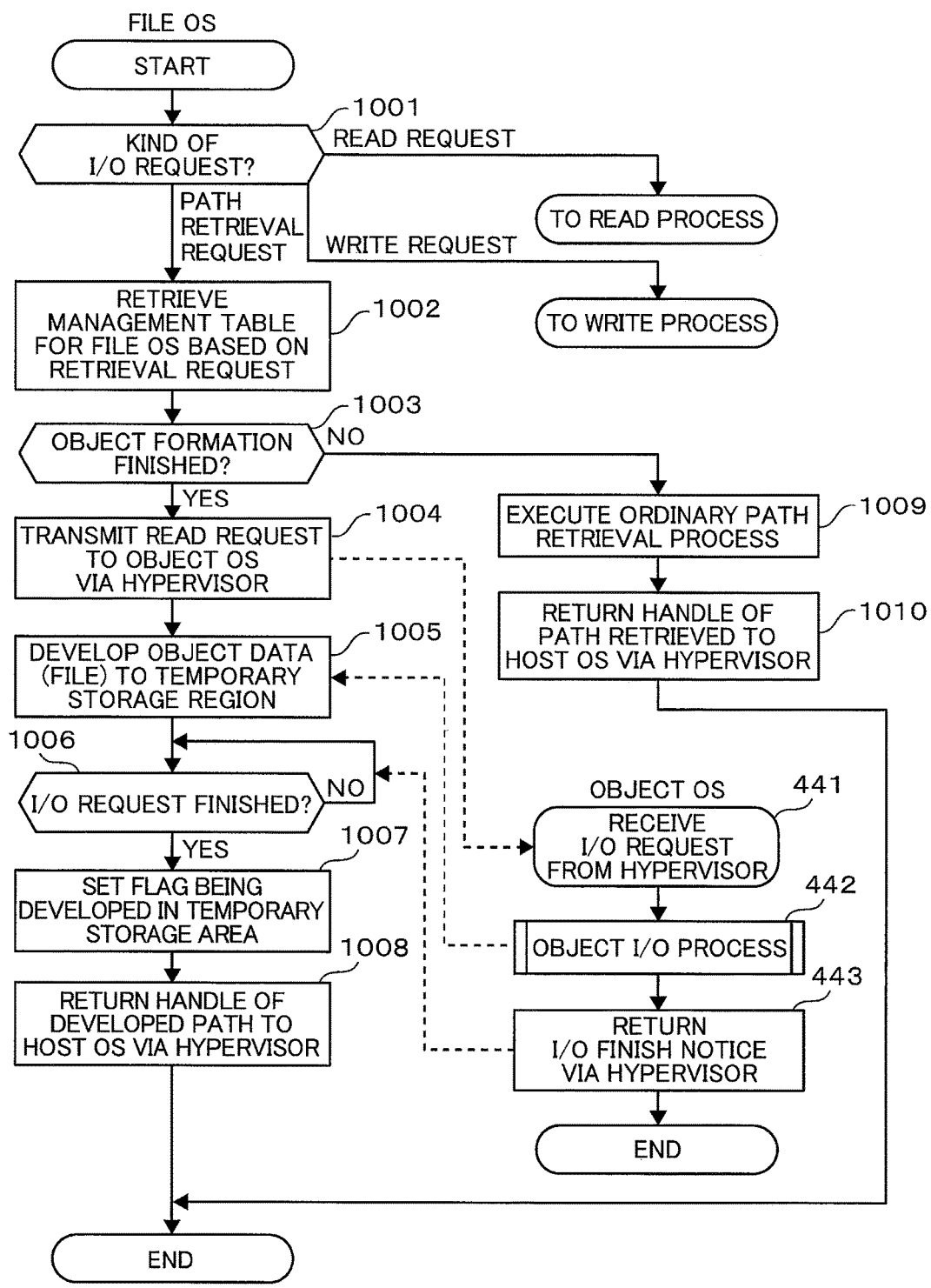
FIG. 10 A view showing an example of a path retrieval request process flow of file OS.

FIG. 10 is a view showing an example of a process flow of the file OS 102. The CPU 203 executes a process flow shown in FIG. 10 when the CPU 203 advances to step 432 of FIG. 4. The CPU 203 executes, for example, an I/O process of the file OS 102, and determines whether an I/O request is a read request or a write request or a retrieval (LookUp) request of a path at step 1001. In a case where the I/O request is a read request, the CPU 203 advances to a read process shown in FIG. 11, and in a case where the I/O request is determined to be the write request, the CPU 203 advances to the write process shown in FIG. 12.

In a case where it is determined that the I/O request is the path retrieval request, the CPU 203 advances to step 1002, and retrieves the management table 900 for file OS based on the virtual device ID, the file system ID, and the file path included in the I/O request. The CPU 203 determines whether the file path which becomes the target of the path retrieval request of the I/O request is subjected to object formation finish at step 1003, that is, whether the object formation finish flag is "1". In a case where it is determined that the object formation is not finished, the CPU 203 advances to step 1009, executes ordinary path retrieval process, and returns a handle of the retrieved file path to host OS 301 via the hypervisor at step 1010.

In a case where it is determined that the object formation is finished at step 1003, the CPU 203 transmits the read request of the file path in which the object formation is finished to the object OS 103 via the hypervisor at step 1004. Although the CPU 203 executes step 441 through step 443 of the object OS 103, the process has already been explained. The CPU 203 ensures the temporary storage region at step 1005, and develops acquired data of the object OS 103 to the temporary storage region.

The CPU 203 awaits a notice of I/O request finish of the object OS 103 at step 1006, sets "81h" to the object formation finish flag of the management table 900 for file OS at step 1007 when a development to the temporary storage region is finished at step 1007 by finishing read out to the region of the object formation finish, and records that the development has been finished to the temporary storage region. Further, the CPU 203 returns to the handle of the file path developed to the host OS 301 via the hypervisor at step 1008.

Figure 11:
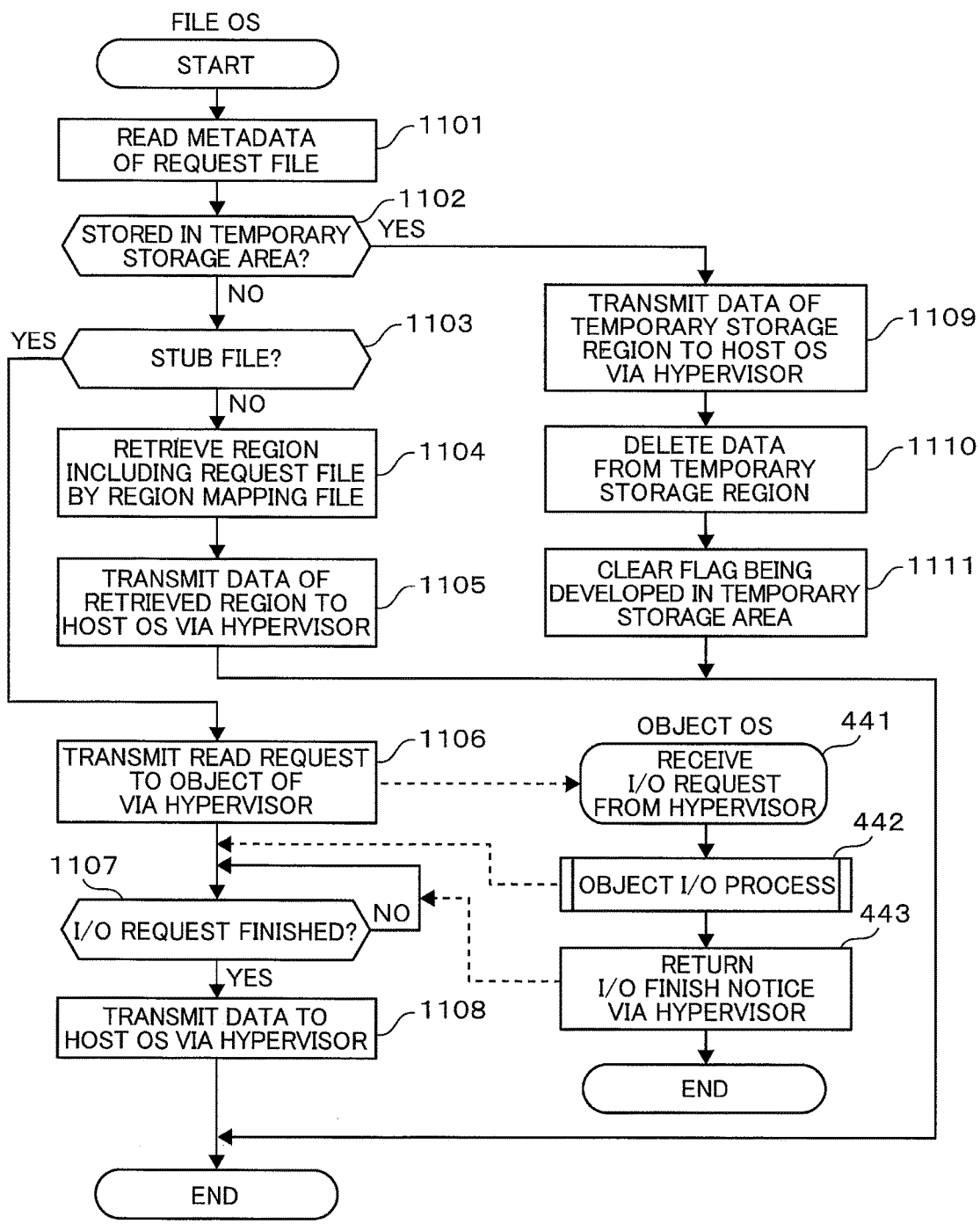
FIG. 11 A view showing an example of a read process flow of file OS.

FIG. 11 is a view showing an example of a read process flow of the file OS 103. When the CPU 203 determines the read request at step 1001 of FIG. 10, the CPU 203 advances to step 1101 shown in FIG. 11 and reads out metadata of the file OS 103. The CPU 203 determines whether the read target has been stored to the temporary storage region at step 1102, that is, whether "81h" is set to the object formation finish flag of the management table 900 for file OS. Further, metadata may be general metadata in a technical field of a file system, and may be, for example, i-node.

In a case where it is determined that the read target is stored to the temporary storage region, the CPU 203 advances to step 1109, and transmits data stored to the temporary storage region to the host OS 301 via the hypervisor. The CPU 203 deletes data which has been transmitted from the temporary storage region at step 1110, changes the object formation finish flag of the management table 900 for file OS from "81h" to "1" at step 1111, and finishes the process. Further, at step 1109, the CPU 203 may transmit only some of data stored to the temporary storage region, for example, only data of a specific in a file path to the host OS 301 by utilizing information of metadata read out at step 1101.

In a case where it is determined that the read target has not been stored to the temporary storage region, the CPU 203 advances to step 1103, and determines whether the read target is a stub file. Therefore, the stub file is recorded as attribute information of metadata read out, for example, at step 1101, and the CPU 203 may determine the attribute information. In a case where the read target is not the stub file, the CPU 203 advances to step 1104, specifies a region of the storage pool 304 by using the management table 900 for file OS, and retrieves a region of the SAS HDD 212 or the like from the region of the storage pool 304 by using the region mapping table 600. The CPU 203 transmits data of the retrieved region to the host 301 via the hypervisor at step 1105, and finishes the process. Further, at step 1105, the CPU 203 may transmit some of data of a retrieved region to the host OS 301 by utilizing information of metadata read out at step 1101.

In a case where the read target is a stub file at step 1103, the CPU 203 advances to step 1106, and transmits a read request to the object OS 103 via the hypervisor, since an actual data in correspondence with the stub file is formed into an object. Step 441 through step 443 of the object OS 103 and step 1107 through step 1108 of the file OS in correspondence therewith are the same as corresponding steps which have already been explained of step 1107 through step 1108. Further, at step 1108, the CPU 203 may transmit only some of data acquired by the object OS 103 to the host 301 by utilizing information of metadata read out at step 1108.

Figure 12:
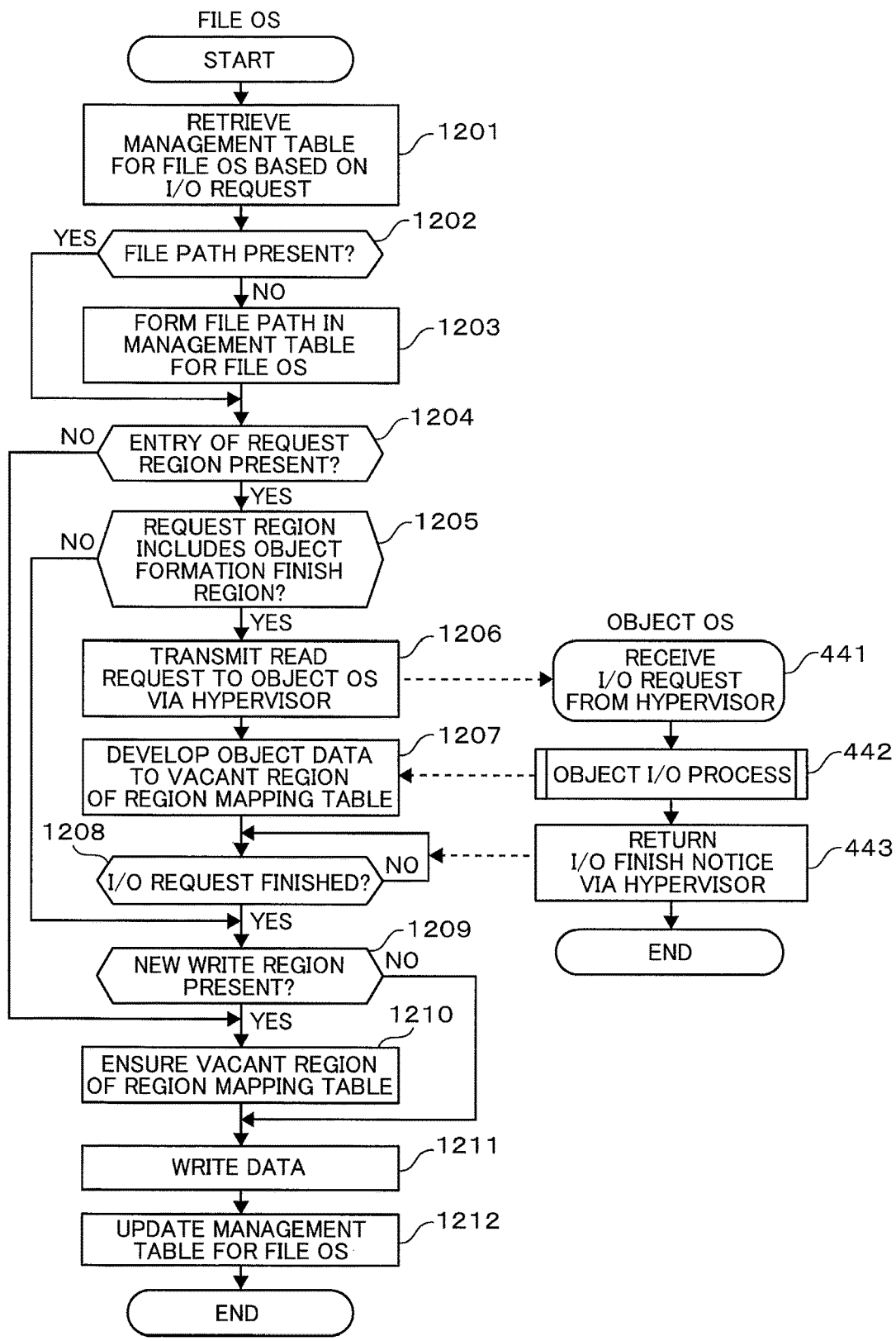
FIG. 12 A view showing an example of a write process flow of file OS.

FIG. 12 is a view showing an example of a write process flow of the file OS 103. When CPU 203 determines the write request at step 1001 of FIG. 10, the operation proceeds to step 1201 shown in FIG. 12, and the CPU 203 retrieves a management table 900 for file OS based on a virtual device ID, a file system ID, and a file path included in the I/O request which is the write request. The CPU 203 determines whether the file path is already present at the management table 900 for file OS as a result of the retrieval at step 1202.

The CPU 203 advances to step 1204 when it is determined that the file path is present, and advances to step 1203 when it is determined that the file path is not present. The CPU 203 creates information of the file path included in the I/O request at the management table 900 for file OS at step 1203. Step 1204 through step 1211 are the same as step 802 through step 809 explained in reference to FIG. 8. The CPU 203 finishes the process by adding to update information at the region mapping table of the region writing data to the management table 900 for the file OS at step 1212.

In this way, even when the file is formed into an object, data also including the file object can be read and written by the file access without being conscious of the object formation.

FIG. 13 is a view showing an example of a management table 1300 for object OS. The management table 1300 for the object OS is a table associating a region of the I/O request of the object access from any of the block OS 101, the file OS 102, the business clients 223 and 227 with the region of the storage pool 304. Although the designation of the region of the I/O request includes the virtual device ID, the object ID, the designation is not limited thereto but any information will do so far as the information is information of specifying the region of the I/O request. The designation of the region of the storage pool 304 has already been explained in reference to FIG. 5. Further, as shown in FIG. 1, the object OS 103 may use only the lowest order Tier, and may use a pool (pool ID) different from the block OS 101 and the file OS 102.

FIG. 14 is a view showing an example of a metadata management table 1400 for the object OS. The metadata management table 1400 is a table including various attribute information concerning the object. The object ID is an ID for identifying the object, and an object state (kind) is a kind of a state of whether the object is effective or ineffective, the block object 114 or the file object 113 or the like. An access number of times is an access number of times of access to the corresponding object, and although in this example, formation of the object is made to be 0 time, the formation of the object may be made to be 1 time.

A management origin OS ID is ID of the block OS 101 or the file OS 102 or the like for managing data which becomes an origin of the object. A data capacity is a capacity of the object. A virtual device ID, VOL ID and LBA are information in correspondence with corresponding items of the table 500 for managing the block OS, and the virtual device ID, the file path, and the file system ID are information in correspondence with corresponding items of the management table 900 for the file OS. Further, although in the example shown in FIG. 14, VOL ID, the file path, the LBA, and the file system ID are exclusive information, and therefore, the information is described at the line, the metadata management table 1400 may include information of these as respectively different lines.

Compression/duplication rejection/AP linkage are flags expressing whether the object is compressed, the duplication is rejected, and the AP linkage is set. A further explanation will be given later concerning a use of the flags. A retention period is a period of retaining the object, and, for example, an object in which the retention period is expired is deleted, the final access time is final time at which the object is accessed.

FIG. 15 is a view showing an example of a read process flow of the object OS 103. When the CPU 203 advances to step 442 shown in FIGS. 4, 7, 8, 10 through 12, the CPU 203 executes the process flow shown in FIG. 15. The CPU 203 executes, for example, I/O process of the object OS 103, and determines whether the I/O request is a read request or a write request at step 1501. In a case where it is determined that the I/O request is a write request, since the write is similar to the object formation, CPU 203 executes a process of the object OS 103 to be explained in reference to FIG. 18.

In a case where it is determined that the I/O request is the read request, the CPU 203 advances to step 1502, and retrieves the management table 1300 for the object OS based on the virtual device ID and the object ID included in the I/O request. In a case where it is determined that an agreeing combination of the virtual device ID and the object ID is not present at the management table 1300 for the object OS, the CPU 203 advances to step 1509, transmits an error report to OS of the I/O request origin via the hypervisor, and finishes the process.

In a case where it is determined that the agreeing combination of the virtual device ID and the object ID is present at the management table 1300 for the object OS, CPU 203 proceeds to step 1504, reads out the pool ID, the entry number, and the page number in correspondence with the agreeing combination of the virtual device ID and the object ID from the management table 1300 for the object OS, and retrieves the region mapping table of a configuration the same as that of FIG. 6 an illustration of which is omitted based on the read out information of these. The CPU 203 acquires the RAID group number, the start LBA number, and the block length from the region mapping table retrieved at step 1505, and read out data of the acquired region.

Here, the CPU 203 reads out information of compression/duplication rejection/AP linkage of the management table 1300 for object OS, in a case of compression of "Y", the read out data is compressed, and therefore, the CPU 203 restores the data to data before being compressed, and in a case where the duplication rejection is "Y", the read out data is subjected to a duplication rejection, and therefore, the read out data is restored to data before subjected to the duplication rejection.

The CPU 203 determines whether the I/O request designates some of data of one object at step 1507, in a case where it is determined that some of data is designated, the CPU 203 proceeds to step 1507, and the CPU 203 cuts out the designated portion of data of the read out data. In a case where it is determined that the portion of data is not designated, the CPU 203 advances to step 1508, and skips the step 1507. The CPU 203 transmits these data to the OS of the I/O request origin via the hypervisor at step 1508, and finishes the process.

Figure 16:
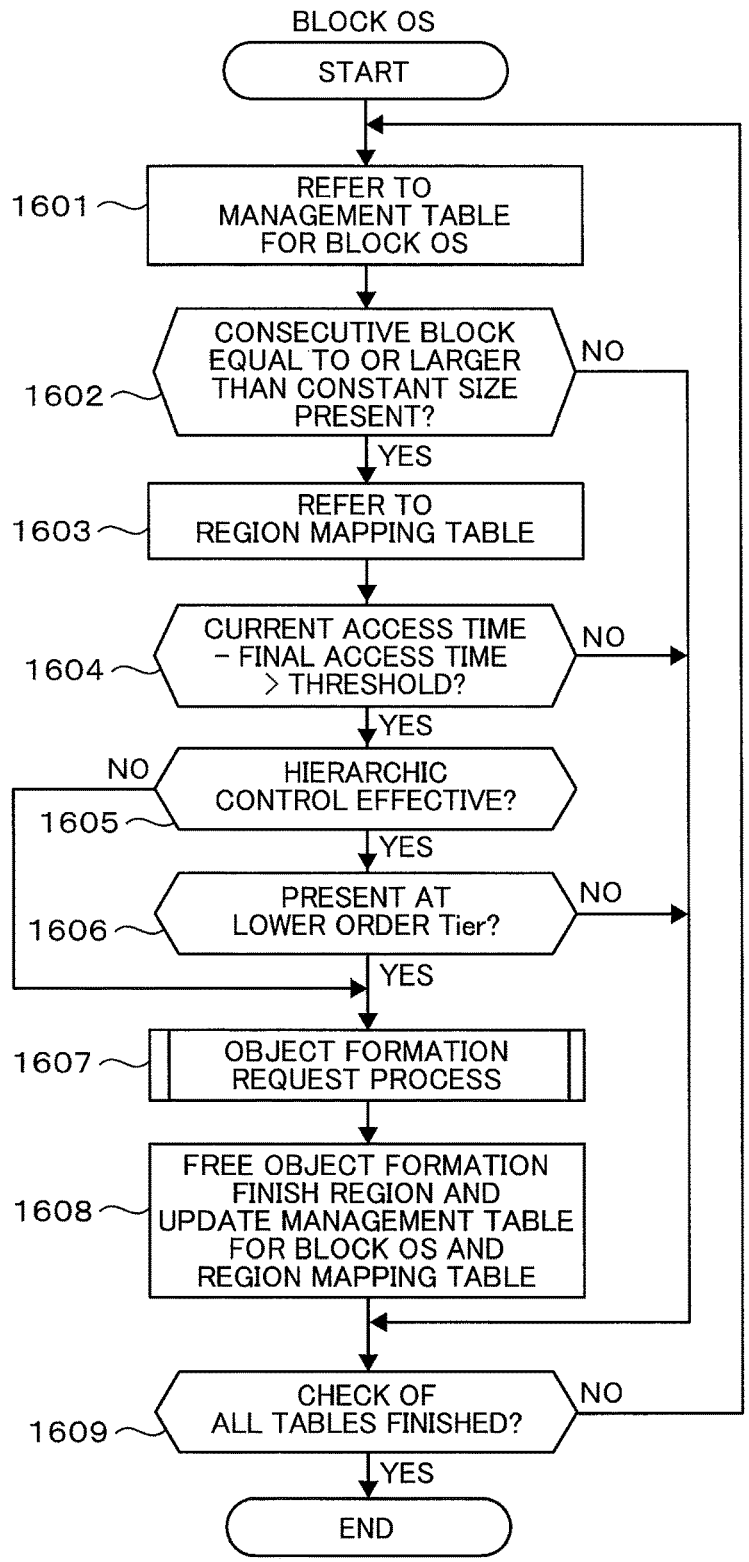
FIG. 16 A view showing an example of a process flow of periodic object formation.

FIG. 16 is a view showing an example of a process flow of object formation of the block OS 101. In executing the block OS 101, CPU 203 executes periodically from step 1601 in a previously set predetermined period, and converts, for example, the consecutive blocks 108 to the block object 114. The CPU 203 reads out information from the management table 500 at step 1601. The CPU 203 determines whether there are consecutive blocks of a constant size or more at step 1602 from the read out information.

For example, in the management table 500 for block OS shown in FIG. 5, it is determined that the virtual device ID is the same as "VST01", the block of the length "100000h" is consecutive from "0000000h" of the LBA, and the block of "50000h" is consecutive from "00150000h" of the LBA in which the VOL ID stays the same as "VOL1". Here, a condition that a new assignment time stays the same may be added, the same time may be time within a predetermined range.

Further, the management table 500 for the block OS may include also information of time which is written finally, and may be added with a condition that the written time stays the same. Such a condition of addition or the value of the same size may previously be set as a policy. In a case where it is determined that the consecutive blocks are not present, the CPU 203 proceeds to step 1609, and checks the block which becomes a target of other determination.

In a case of determining that the consecutive blocks are present, the CPU 203 proceeds to step 1603, and reads out information from the region mapping table 600 concerning the consecutive blocks satisfying the condition at step 1602. The CPU 203 determines whether an access is made during a time period which is longer than a predetermined time period, that is, whether a result of subtracting a final request time from the current time exceeds a predetermined threshold at step 1604. The predetermined threshold may previously be set as the policy. In a case where it is determined that the threshold is not exceeded, the CPU 203 proceeds to step 1609, and checks a block which becomes a target of other determination.

In a case where it is determined that the threshold is exceeded, the CPU 203 determines whether the consecutive blocks are a target of a hierarchic control, that is, whether the effective flag is "Y" at step 1605. In a case where it is determined that the consecutive blocks are the target of the hierarchic control, the CPU 203 determines further whether the consecutive blocks are present at a lower order Tier in the hierarchy, that is, whether the hierarchic flag is set to Tier-3. It may previously be set as a policy which Tier is the lower order Tier.

In a case where it is determined that the consecutive blocks are not present at the lower order Tier, the CPU 203 advances to step 1609 and checks a block which becomes an target of the determination otherwise. In a case where it is determined that the consecutive blocks are present at the lower order Tier, the consecutive blocks satisfy all the conditions of the object formation, and therefore, the CPU 203 proceeds to step 1607, and requests the object formation of the consecutive blocks OS 103 to the object OS 103. An explanation will be given later of a process of step 1607 in reference to FIG. 18.

The CPU 203 frees a region of the consecutive blocks of the object formation finish at step 1608 and updates the region mapping table 600, and updates the management table 500 for block OS by setting the object formation finish flag and the object ID. CPU 203 determines whether other block which becomes an target of the determination remains in the management table 500 for block OS at step 1609, returns to step 1601 when it is determined that the block remains and check is not finished, and finishes the process when it is determined that the block does not remain and check is not finished, and finishes the process when it is determined that the block does not remain and the check is finished.

Also concerning the file, CPU 203 may execute the same process at the file OS 102 by substituting the consecutive blocks explained above for the file.

Figure 17:
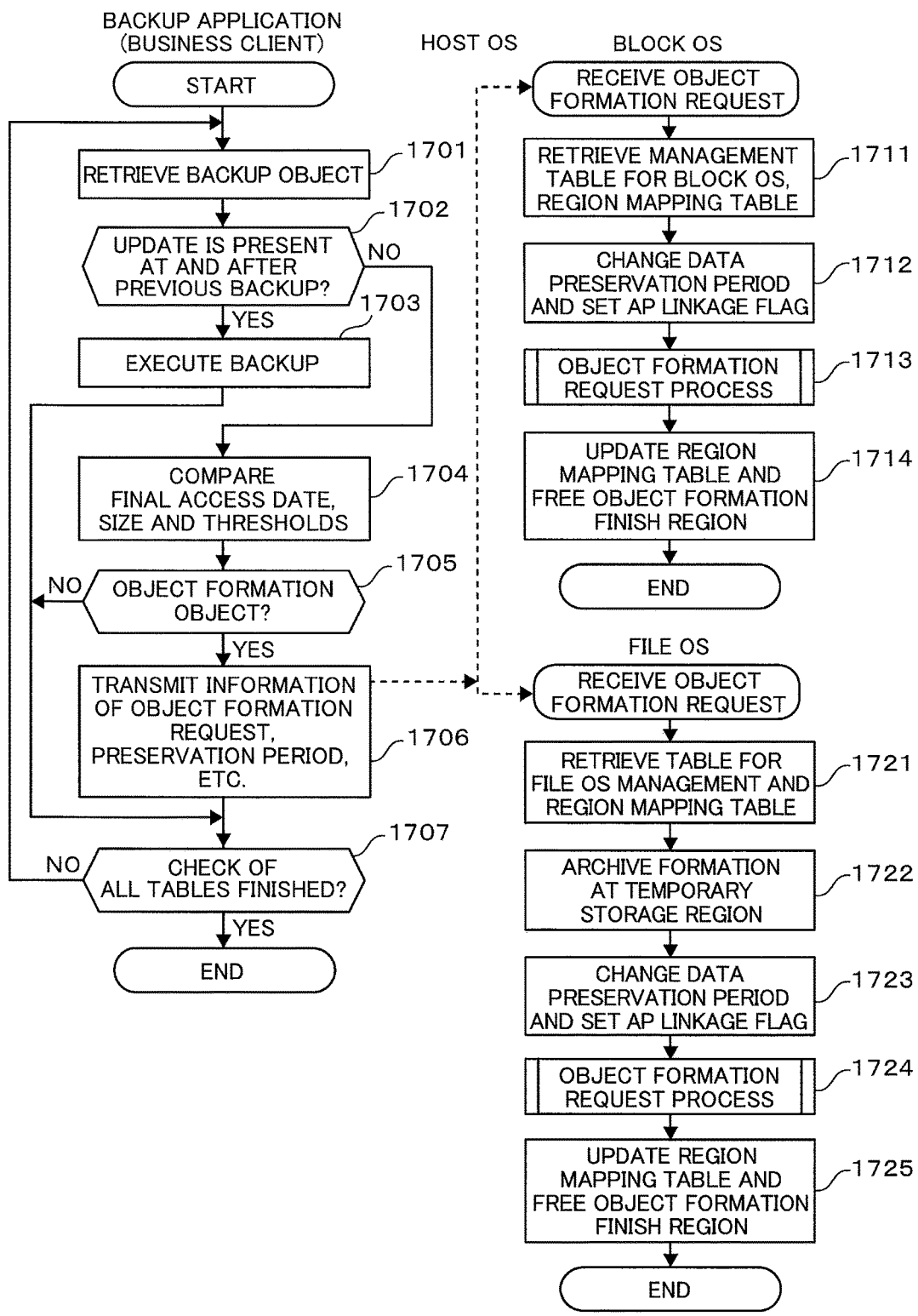
FIG. 17 A view showing an example of a process flow of object formation by AP linkage.

FIG. 17 is a view showing an example of a process flow of the object formation by AP linkage. Although the object is formed by a condition of access time or the like in the explanation in reference to FIG. 16, in this example, the object is formed by designation of an application of the business clients 223 and 227. Further, designation of a management computer 224 or the like will do. In the following, a CPU of business clients 223 and 227 is made to be a client CPU.

The client CPU retrieves a file, a folder, a file system or a block which becomes a target of backup at step 1701 of a backup application. Which file, folder, file system or block becomes a target of the backup depends on a business content of the business clients 223 and 227, and therefore, an explanation will be limited here. The client CPU determines whether the target of backup is updated at and after backup of a previous time at step 1702.

In a case where it is determined that the target of backup is updated, the client CPU proceeds to step 1703, executes backup as a backup application, and proceeds to step 1707. In a case where it is determined that the target of backup is not updated, the client CPU compares final access date and size with respective predetermined thresholds at step 1704. Here, a final access date and a size of the target of backup are values managed in the business clients 223 and 227 and prescribed thresholds may be previously set in the business clients 223 and 227.

The client CPU determines whether the target of backup is a target of object formation at step 1705. As conditions of the target of object formation, for example, the final access date is prior to the threshold, and the size is larger than the threshold. In a case where it is determined that the target of backup is the target of object formation, the client CPU transmits the object formation request to the physical server 210 along with an information retention period or the like at step 1706, and proceeds to step 1707. In a case where it is determined that the target of backup is not the target of object formation, the client CPU proceeds to step 1707, and determines whether the retrieval of all the targets of backup has been finished.

In a case where it is determined that the retrieval of all the targets of backup is not finished, the client CPU returns to step 1701, in a case where it is determined that the retrieval of all the targets of backup is finished, the client CPU finishes the process of the backup application. Further, although the backup is explained in this example, the application is not limited to the backup.

The physical server 201 receives the object formation request or the like transmitted from the business clients 223 and 227 by the host OS 301, the CPU 203 interchanges the object formation request or the like to the block OS 101 or the file OS 102 as the host OS 301, in accordance with whether the target of backup subjected to the object formation request is the block or the file.

The CPU 203 retrieves the management table 500 for block OS and the region mapping table 600 at step 1711 of the block OS 101 and specifies the start LBA or the like of the region subjected to object formation request. The CPU 203 changes the retention period of the metadata management table 1400 to the retention period transmitted along with the object formation request at step 1712, and sets an AP linkage to "Y". The CPU 203 requests the object formation of a region specified to the object OS 103 at step 1713. The CPU 203 updates the region mapping table 600 by freeing a region of a consecutive blocks subjected to object formation finish at step 1714, and finishes the process.

Step 1721 and step 1723 through step 1725 of the file OS 102 are the same as step 1711 through step 1714 of the block OS 101 by only substituting a block for file. At step 1722, the CPU 203 archives a file system or a folder to a single file to be stored to the temporary storage region in a case where the backup region subjected to the object formation request includes plural files of a file system or a folder or the like. Thereby, the CPU 203 can substitute a single archive to one object.

Further, step 701 shown in FIG. 7 may determine whether the I/O request is any of the read request, the write request, or the object formation request in place of a determination of whether the I/O request is a read request, and the CPU 203 may execute step 1711 to step 1714 in a case where it is determined that the I/O request is the object formation request. Therefore, even in the object formation request, information of the virtual device ID, the VOL ID, the LBA, and the block length is received, and the CPU 203 uses information of these for retrieving the management table 500 for block OS.

Here, in a case where object formation is requested by, for example, "VST01", "VOL1", "00100000h", and "20000h", the CPU 203 may not execute object formation since a management unit differs from that of the management table 500 for block OS, or a block length "50000h" may be subjected to the object formation from "0010000h" of LBA including a range of a request of the object formation. Further, the CPU 203 may divide a block length "30000h" from the block length "20000h" and "0012000h" of LBA, and subject only a block length "20000h" to the object formation from "0010000h" of LBA.

Similarly, in a determination of a kind of the I/O request of step 1001 shown in FIG. 10, the I/O request may determine any of a read request, a write request, a path retrieval request, and an object formation request, in a case where it is determined that the I/O request is the object formation request, the CPU 203 may execute step 1721 through step 1725.

Figure 18:
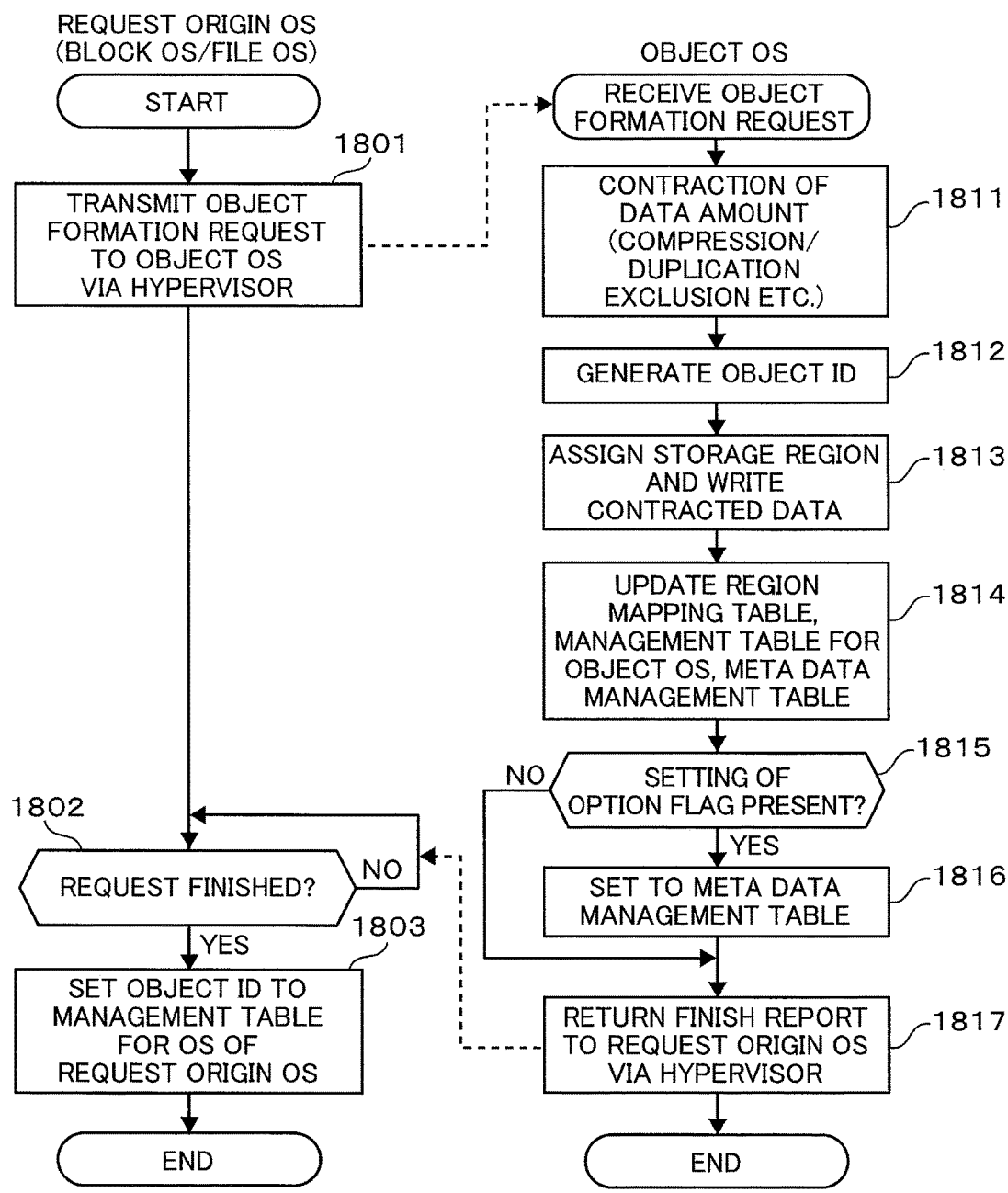
FIG. 18 A view showing an example of object formation of object OS/write process flow.

FIG. 18 is a view showing an example of a process flow of the object formation. Step 1801 through 1803 correspond to, for example, step 1713 or step 1724 of a request origin OS which is the block OS 101 or the file OS 102. First, the CPU 203 transmits the object formation request to the object OS 103 via the hypervisor at step 1801. Further, the CPU 203 awaits finish of a request process of the object OS 103 at step 1802, sets the object ID at the management table for OS of the request origin OS when finished, and finishes the process.

When the object formation request is received, the CPU 203 contracts an amount of data of the target of object formation at step 1811 of the object OS 103. That is, the CPU 203 compresses data or excludes duplication. Here, data may further be enciphered. At step 1811, a hash value is calculated for data an amount of which is contracted at step 1811, and the CPU 203 generates an object ID at step 1812. The CPU 203 writes contracted data by assigning a vacant storage region based on the region mapping table at step 1813, and updates the region mapping table, the management table 1300 for object OS, and a metadata management table 1400 by adding information in accordance with written data thereto at step 1814.

The CPU 203 determines whether an option flag of the AP linkage, a retention period or the like is set at step 1815, and sets information of the option flag to the metadata management table 1400 in a case where the option flag is set at step 1816. The CPU 203 returns a finished report of a request of object formation and a generated object ID to a request origin OS via the hypervisor at step 1817, and finishes the process.

In this way, even when the object formation is not executed by a special back server or the like, the object formation is enabled by a process with the block OS 101 or the file OS 102 and the object OS 103 executed on plural VMs.

Figure 19:
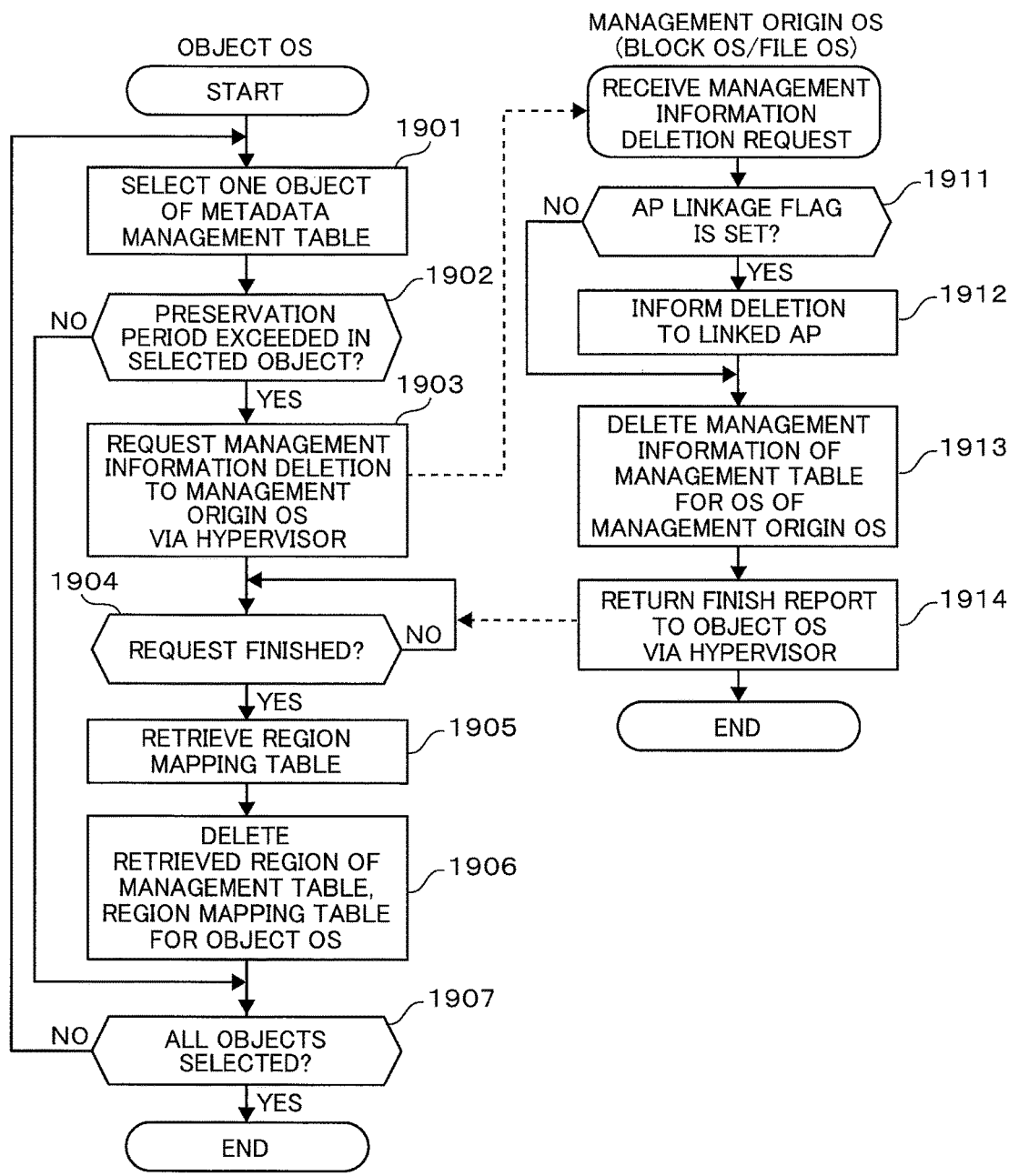
FIG. 19 A view showing an example of a deletion process flow of an object by a retention period.

FIG. 19 is a view showing an example of a process flow of deleting an object. This example deletes an object a retention period of which is expired. A process flow of the object OS 103 shown in FIG. 19 is executed periodically. It may previously set by which period the process flow is executed. The CPU 203 selects one object from a metadata management table 1400 at step 1901 of the object OS 103.

The CPU 203 compares a retention period of a selected object with the current time, and determines whether a retention period is expired.

In a case where it is determined that the retention period is not expired, the CPU 203 advances to step 1907 and in a case where it is determined that the retention period is expired, the CPU 203 advances to step 1902 and requests the deletion of the management information to the management origin OS via the hypervisor. That is, although the object expiring the retention period is deleted since it is not necessary to preserve the object, a change of information of the management origin OS is requested such that mismatching that whereas information of preserving the object at the management origin OS is maintained at the management origin, actually, the object is not preserved. The management origin OS is, the block OS 101 when, for example, the object is the block object, and is the file OS 102 when the object is the file object, which is recorded to the management origin OS ID of the metadata management table 1400.

The CPU 203 awaits a notice of finishing the request process of the management origin OS at step 1904, and retrieves a region of an object to be deleted from the region mapping table at step 1905. The CPU 203 deletes information related to the retrieved region from the management table 1300 for the object OS and the region mapping table at step 1906. The CPU 203 determines whether the retention periods of all the objects are investigated, that is, whether all the objects are selected at step 1907, and in a case where all the objects are not selected and the objects to be investigated remain, the CPU 203 returns to step 1901, and finishes the process in a case of selecting all the objects.

The CPU 203 determines whether the AP linkage of the metadata management table 1400 becomes "Y" at step 1911 when the request of deleting the management information is received at the management origin OS. In a case where it is determined that the AP linkage becomes "Y", the linkage is designated from the application, and therefore, the CPU 203 notifies of a deletion of data to the application at step 1912. The CPU 203 deletes the management information of the management table 500 for block OS in a case of the management origin OS, that is, the block OS 101 at step 1913, and deletes the management information of the management table 900 for file OS in a case of the file OS 102. The CPU 203 returns the finish report to the object OS 103 via the hypervisor at step 1914, and finishes the process.

In this way, all of the block object 114 which is data subjected to the block access, the file object 113 which is data subjected to the file access, and an object which is data subjected to the object access are unified to an object, subjected to the period management, and deleted, and therefore, it is not necessary to individually manage respective data, and a burden of a manager of data is alleviated.

Figure 20:
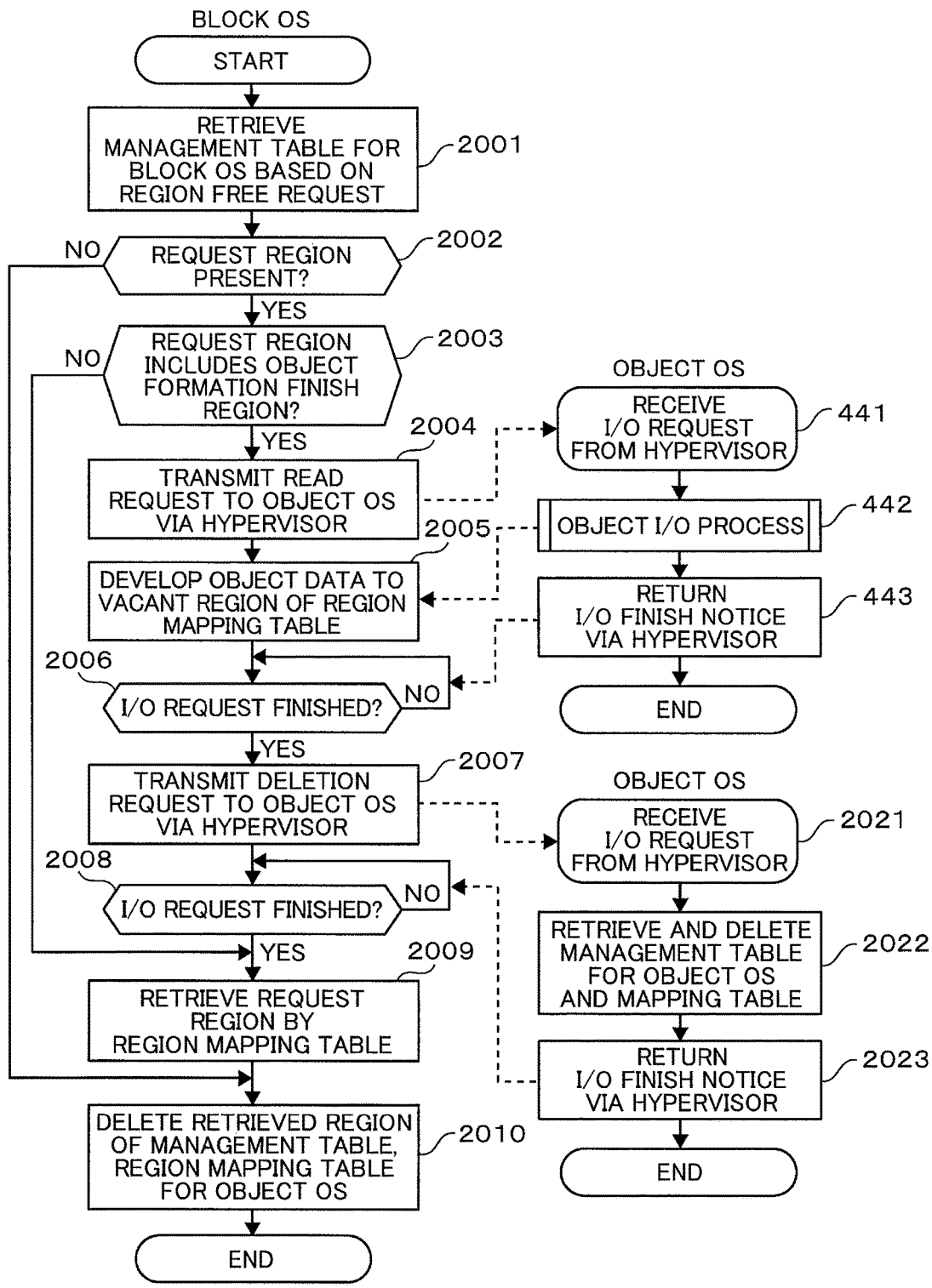
FIG. 20 A view showing an example of a deletion process flow of object by AP designation.

FIG. 20 is a view showing an example of a process flow of deleting an object by designation of application. For example, in the block access, there are an UNMAP command and a WRITE SAME command in a specification of SCSI and these commands are region freeing requests, and free a region when received. Therefore, the CPU 203 retrieves a region which becomes a target of a region freeing request from the management table 500 for block OS at step 2001. Further, the CPU 203 determines whether a region which becomes a target of a region freeing request is present in the management table 500 for block OS at step 2002.

In a case where it is determined that the region is not present, the process is finished, in a case where it is determined that the region is present, the CPU 203 determines whether the region of the object formation finish is included in a present region at step 2003. In a case where it is determined that the present region does not include the region of the object formation finish by retrieving, the CPU 203 advances to step 2009, retrieves a region which becomes a target of a region freeing request from a region mapping table 600, deletes the region from the management table 500 for the object OS and the region mapping table 600, and finishes the process.

In a case where it is determined that the present region includes the region of the object formation finish by retrieving, the CPU 203 advances to step 2004, and transmits a read request of a region of the object formation finish to the object OS 103 via the hypervisor. The CPU 203 develops object data acquired from the object OS 103 in a vacant region at step 2005, and awaits finishing of the I/O request process at step 2006. When the I/O request process is finished, the CPU 203 transmits a request of deleting a read region to the object OS 103 via the hypervisor at step 2007, and awaits finishing of the I/O request process at step 2008.

When the I/O request process is finished, the region of the object formation finish is moved to the block, and all becomes blocks collectively with the region which is not subjected to the object formation finish and therefore, the CPU 203 deletes the region subjected to the target of the region freeing request at steps 2009, 2010 and finishes the process.

Step 441 through step 443 of the object OS have already been explained. Step 2021 through step 2023 of the object OS are a process for deleting the object, the CPU 203 receives a deletion request as the I/O request at step 2021. At step 2022, the CPU 203 retrieves and deletes a region which becomes an object to be deleted object, that is, a region which is determined as the object formation finish region from the management table 1400 for the object OS and the region mapping table at step 2003. Further, the CPU 203 returns a notice of finishing the I/O request process to the block OS 101 via the hypervisor at step 2023.

As explained above, the consecutive blocks are formed into the object, and therefore, an increase in a number of objects is restrained. Further, also the block or the file subjected to the object formation can be subjected to the block access or the file access. Further, the block, the file, and the object are unified and managed as the object.

Second Embodiment

FIG. 21 is a view of an example of migration between physical servers. The example is an example for migrating VOL of the physical server 2101 to the VOL of the physical server 2102 in a state in which the consecutive blocks 2111 are subjected to the object formation to the block object 2114 in the physical server 2101. The block 2112 included in the VOL of the physical server 2101 is moved to the block 2122 included in the VOL of the physical server 2102. In contrast thereto, the consecutive blocks 2111 are not moved to the consecutive blocks 2121 since the consecutive blocks 2111 are subjected to the object formation and data as the block is, not present.

Hence, the management data (metadata) 2113 of the physical server 2101 is copied to the physical server 2102 and becomes the management data (metadata) 2123, thereby, information of the block object 2114 of the physical server 2101 is shared by the physical server 2102. When the block access is made to data of the block 2122, the block OS 2126 accesses the block 2122. When the block access is made to the consecutive blocks 2121, the block OS 2126 does not access the consecutive blocks 2121, transfers the I/O request to the object OS 2115 by using the management table (metadata) 2123, and the object OS 2115 accesses the block object 2114. A specific process of an access of the consecutive blocks 2121 to the block object 2114 subjected to the object formation has already been explained in which only the physical server differs.

As explained above, the consecutive blocks 2111 and 2121 subjected to the object formation are present at the lower position Tier, a possibility of being accessed is small, and therefore, also in a migration, time of migration is shortened since the block project 2114 is not moved also in the migration. Further, although there is a little possibility, in a case of needing an access, the block object 2114 can be accessed by the object OS 2115. Further, the block object 2114 may be moved to the physical sever 2102 later when loads of the physical servers 2101 and 2102 are low.

Third Embodiment

Figure 22:
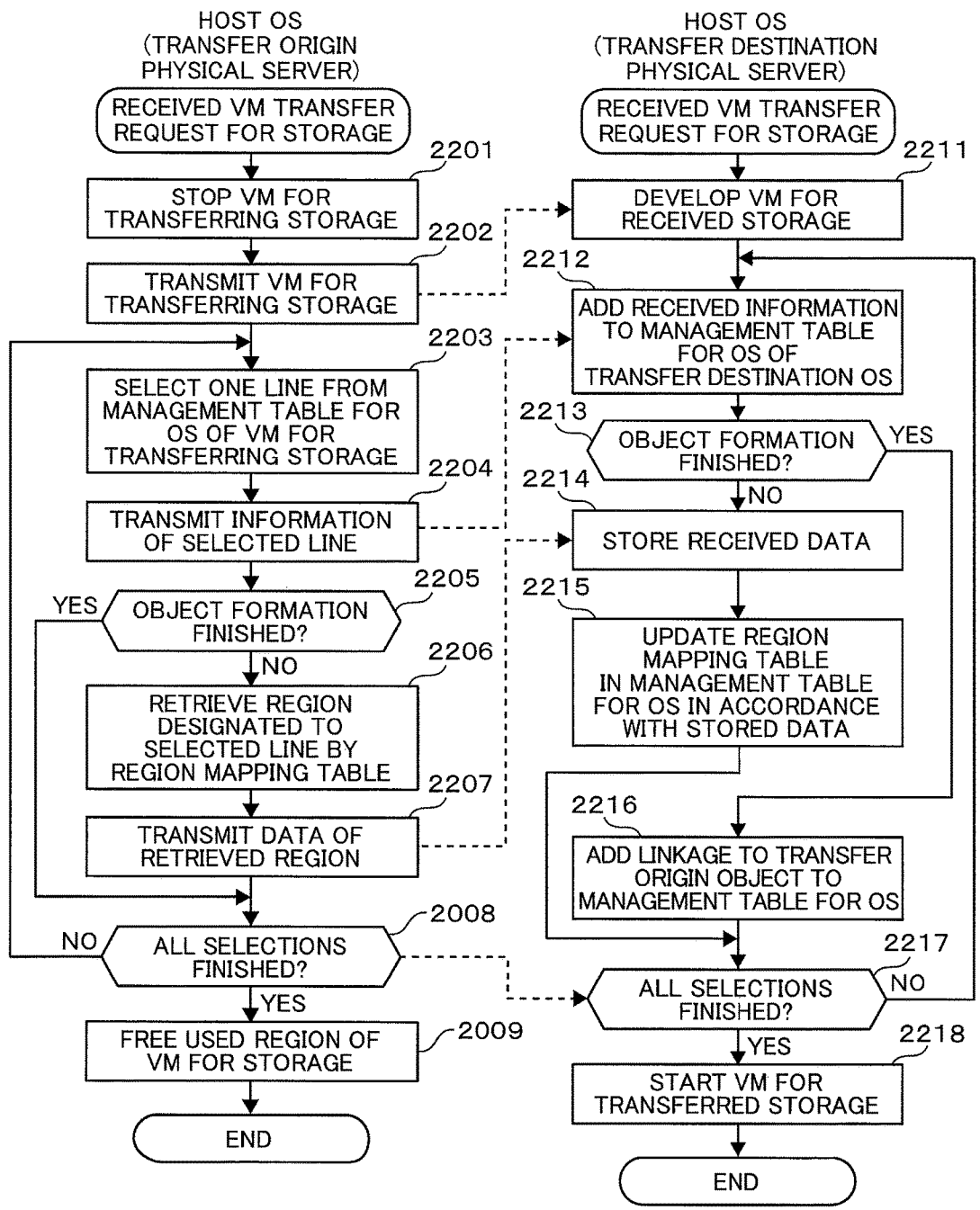
FIG. 22 A view showing an example of a transfer process flow of VM for storage.

FIG. 22 is a view showing an example of a process flow of transferring the VM for storage. Here, the VM for storage is a VM of the block OS 101, a VM of the file OS 102, or a VM of the object OS 103, and transfers the block OS 101 to other physical server with, for example, the physical server as a transferring origin as in an arrow mark 319 shown in FIG. 3. Transfer is executed by process of the host OS of the transferring origin physical server and the host OS of the transfer destination physical server, and therefore, an explanation will be given of process flows of the respective host OSs. Further, the CPU of the transferring origin physical server is made to be the transfer origin CPU, and the CPU of the transferring destination physical server is made to be the transferring destination CPU.

The transfer origin CPU stops the VM for storage transferring at step 2201 of the host OS of the transfer origin physical server such that values of respective tables or the like are not changed. Further, the transfer origin CPU transmits the VM for storage transferred at step 2202 to the transfer designation physical server. For example, a VM image on a memory of the transfer origin physical server is transmitted. In contrast thereto, the transfer designation CPU receives the VM for storage at step 2211 of host OS of the transfer designation physical server, and develops the VM for storage received on a memory of the transfer designation physical server.

The transfer origin CPU selects one line in the management table 500 for block OS when the management table of VM for storage moved at step 2203, that is, the VM for moving storage is the block OS 101. The line is a combination of information of "VST01", "1", "VOL1", "00000000h", "100000h", "pool-1", "1000h", "2013/0312 10:20:30", "0", and "–". Further, the transfer origin CPU transmits information of the line selected at step 2204 to the transfer destination physical server. In contrast thereto, at step 2212, the transfer destination CPU adds information of a line received at the management table for the OS of VM for the developed storage.

The transfer origin CPU determines whether a flag finished with the object formation in the line selected at step 2205 is "1". In a case where it is determined that the object formation is finished, the object is not transmitted similar to the block object 2114 shown in FIG. 21, and therefore, the migration origin CPU advances to step 2208. In a case where it is determined that the object formation is not finished, data is transmitted, and therefore, at step 2206, the transfer origin CPU retrieves a region designated by the selected line from the region mapping table, and transmits data of a region retrieved at step 2207 to the transfer destination physical server.

The transfer destination CPU determines whether the object formation is finished at step 2213 similar to step 2205 when information of the line is added at step 2212. In a case where it is determined that the object formation is finished, also the transfer origin CPU advances to step 2216 since data is transmitted by determining by the same information, adds linkage to the object OS managing the transfer origin physical server or the object ID of the transfer origin to the object ID of the management table for OS, such that the VM for storage of the transferring destination can access the object of the transfer origin.

The transfer origin CPU advances to step 2214 in a case where it is determined that the object formation is not finished. Further, the transfer destination CPU receives data at step 2214, and stores data to a vacant region of the region mapping table in correspondence with transmission at step 2207 of the transfer origin CPU explained above to be stored to the vacant region of the region mapping table. Further, the transfer destination CPU updates the region mapping table and the management table for OS for the data stored at step 2215, and makes the data manageable by the VM for storage.

The transfer origin CPU determines whether selection of all the lines of the management table for OS is finished at step 2208, and transmits information of whether selection is finished to the transfer destination physical server. In a case where it is determined the selection is not finished, the transfer origin CPU returns to step 2203 and selects a next line. In a case where it is determined that the selection is finished, the transfer origin CPU advances to step 2209, and finishes the process by freeing all the regions including the VM image or the table used by the VM for storage.

At step 2217, the transfer destination CPU receives information of whether the selection is finished, in a case where it is determined that the selection is not finished, the transfer destination CPU returns to step 2212, in a case where it is determined that the selection is finished, the transfer destination CPU advances to step 2218, and finishes the process by starting the VM for a transferred storage.

As explained above, the VM for storage is made to be able to transfer between different physical servers. Further, the data of finishing the object formation is not moved, and therefore, transfer time is shortened.

LIST OF REFERENCE SIGNS

101 block OS
102 file OS
103 object OS
108 consecutive blocks
111 stub file
113 file object
114 block object
203 CPU
301 host OS

The invention claimed is:

1. A computer connected to a network, including a CPU and a plurality of storages devices, and executing a plurality of virtual machines,
wherein as a first virtual machine:
the CPU requests a third virtual machine to form an object from a block region upon determining the block region is not subject to a block access for a predetermined time period or longer stored in a first storage device and upon determining a number of consecutive blocks of the block region are a predetermined size or more; and
the CPU converts a first block access for the block region formed into the object to a first object access, based on a target block region of the first block access received via the network;
as a second virtual machine:
the CPU accesses a second storage device by processing a first file access, or converts the first file access to a second object access, based on a target file region of the first file access received via the network;
as a third virtual machine:
the CPU forms the object from the block region which is not subject to the block access for the predetermined time period or longer and has the number of consecutive blocks of the block region that are the predetermined size or more, and stores the object to a first region of a third storage device, in accordance with a request of the object formation;
accesses the first region of the third storage device by processing the first object access converted from the first block access;
accesses a second region of the third storage device by processing the second object access converted from the first file access; and
accesses the third storage device by processing a third object access for the first region or the second region received via the network.

2. The computer according to claim 1,
wherein the CPU, as the second virtual machine, requests to form an object from a file which is stored in the second storage device and is not subject to a file access for a predetermined time period or longer, and
wherein the CPU, as the third virtual machine, forms an object from a block and/or a file requested, and stores the object to the third storage device.

3. The computer according to claim 2,
wherein the CPU hierarchically controls a high speed storage device, a middle speed storage device and a low speed storage device of the first storage device, and requests to form the object from the blocks which are not subject to a block access for the predetermined time period or longer and has the number of consecutive blocks of the block region that are the predetermined size or more stored to the low speed storage device.

4. The computer according to claim 3,
wherein the CPU, as the first virtual machine, determines the consecutive blocks in the block region are consecutive in a case where a plurality of addresses of a plurality of block accesses received via the network are consecutive.

5. The computer according to claim 4,
wherein the CPU, as the third virtual machine, deletes an object which is stored in the third storage device and is not subjected to an object access for a predetermined time period or longer.

6. The computer according to claim 5,
wherein, as the first virtual machine, the CPU requests to form an object from designated blocks stored to the first storage device, based on an object formation request received via the network, and transmits information concerning the deletion via the network when the information of the deleted linkage object is notified; and
the CPU, as the third virtual machine, forms a linkage object from the requested designated blocks, stores the linkage object to the third storage, deletes the linkage object which is not subject to object access for a predetermined time period or longer, and notifies information of the deleted linkage object.

7. The computer according to claim 6, wherein the predetermined time period and the predetermined size for the CPU to request to form an object are respectively set previously as policies.

8. A method of controlling a computer,
wherein, in a method of controlling a computer connected to a network, including a CPU and a plurality of storage devices, and executing a plurality of virtual machines, the CPU, as a first virtual machine, requests a third virtual machine to form an object from a block region upon determining the block region, which is stored to the first storage device, is not subject to a block access for a predetermined time period or longer, and upon determining a number of consecutive blocks of the block region are a predetermined size or more;

the CPU, as the third virtual machine, forms the object from the block region which is not subject to a block access for the predetermined time period or longer and has the number of consecutive blocks of the block region that are the predetermined size or more, stores the object to a first region of a third storage device, in accordance with a request to form the object;

the CPU, as the first virtual machine, converts a first block access to a first object access for the block region formed into the object, based on a target block region of the first block access received via the network;

the CPU, as the third virtual machine, accesses the first region of the third storage device by processing the first object access converted from the first block access;

the CPU, as the second virtual machine, accesses the second storage device by processing a first file access, or converts the first file access to a second object access, based on a target file region of the first file access received via the network; and the CPU, as the third virtual machine, accesses a second region of the third storage device by processing the second object access converted from the first file access, accesses the third storage device by processing a third object access for the first region or the second region received via the network and is the object access.

* * * * *